United States Patent
Singh et al.

(10) Patent No.: US 9,378,512 B2
(45) Date of Patent: Jun. 28, 2016

(54) INTERACTION BETWEEN ADS AND APPLICATIONS

(75) Inventors: Balbir Singh, Redmond, WA (US); Shankar Vaidyanathan, Sammamish, WA (US); Melissa W. Dunn, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 220 days.

(21) Appl. No.: 12/826,259

(22) Filed: Jun. 29, 2010

(65) Prior Publication Data

US 2011/0320956 A1    Dec. 29, 2011

(51) Int. Cl.
G06Q 30/02    (2012.01)

(52) U.S. Cl.
CPC .................. *G06Q 30/0241* (2013.01)

(58) Field of Classification Search
CPC ........................................ G06Q 30/02
USPC ........................................... 715/747
See application file for complete search history.

(56) References Cited

U.S. PATENT DOCUMENTS

| | | | | |
|---|---|---|---|---|
| 7,546,534 | B1* | 6/2009 | Andrews et al. | 715/747 |
| 7,627,830 | B1* | 12/2009 | Espinoza et al. | 715/764 |
| 2007/0101433 | A1* | 5/2007 | Louch et al. | 726/25 |
| 2008/0010130 | A1* | 1/2008 | Pyhalammi et al. | 705/14 |
| 2008/0010133 | A1* | 1/2008 | Pyhalammi et al. | 705/14 |
| 2008/0097830 | A1 | 4/2008 | Kim | |
| 2009/0024482 | A1* | 1/2009 | Synstelien et al. | 705/14 |
| 2009/0199114 | A1 | 8/2009 | Lewis et al. | |
| 2009/0217186 | A1 | 8/2009 | Pyhalammi et al. | |
| 2009/0287559 | A1 | 11/2009 | Chen et al. | |
| 2010/0056127 | A1* | 3/2010 | Osborne et al. | 455/418 |
| 2010/0222046 | A1* | 9/2010 | Cumming | 455/418 |

OTHER PUBLICATIONS

Hristova, et al., "Ad-me: Wireless Advertising Adapted to the User Location, Device and Emotions", Retrieved at << http://www.agentfactory.com/~rem/PRISM-InfoPack/Mobile/HICSS_NO.pdf >>, Proceedings of the 37th Hawaii International Conference on System Sciences—2004, pp. 10.

Hjelsvold, et al., "Web-based Personalization and Management of Interactive Video", Retrieved at << http://www.www10.org/cdrom/papers/pdf/p405.pdf >>, May 1-5, 2001, pp. 129-139.

Chester, et al., "Digital Marketing", Retrieved at <<http://www.digitalads.org/documents/NPLAN_digital_mktg_memo.pdf >>, Jul. 21-22, 2008, pp. 21.

(Continued)

*Primary Examiner* — Jennifer To
*Assistant Examiner* — Ashley Fortino
(74) *Attorney, Agent, or Firm* — Steven Spellman; Tom Wong; Micky Minhas

(57) ABSTRACT

Various technologies, methods, systems, processes, and compositions of matter pertaining to advertisements, and advertisement interactions with users and applications may be described. A single advertisement may be selected for a user based on a single lookup of the user profile at an advertisement server. The advertisement server may send a single adget to the user. This single adget is then seamlessly used on multiple devices. Each device may automatically select a different View of the advertisement. Each device may automatically render a different Actions as supported by a device.

20 Claims, 23 Drawing Sheets

(56) References Cited

OTHER PUBLICATIONS

Hodes, et al., "A Document-based Framework for Internet Application Control", Retrieved at <<http://reference.kfupm.edu.sa/content/d/o/a_document_based_framework_for_internet_251901.pdf >>, 1999, pp. 12.

Vaidyanathan, et al., "Interactive Host-Aware Advertising", U.S. Appl. No. 12/061,503, filed Apr. 2, 2008.

Vaidyanathan, et al., "Adaptive Run-Time Advertisements", US. Appl. No. 12/242,406, filed Sep. 30, 2008.

Dunn, et al., "Optimizing Ads by Customization for a Target Device", U.S. Appl. No. 12/506,762, filed Jul. 21, 2009.

Kiciman, et al., "Social Browsing", U.S. Appl. No. 12/614,457, filed Nov. 9, 2009.

"Response to the First Office Action and Search Report Issued in Chinese Patent Application No. 201110192566.5", Filed Date: Dec. 18, 2015, 17 Pages.

"First Office Action and Search Report Issued in Chinese Patent Application No. 201110192566.5", Mailed Date: Aug. 3, 2015, 12 Pages.

"Second Office Action Issued in Chinese Patent Application No. 201110192566.5", Mailed Date: Jan. 15, 2016, 8 Pages.

"Response to the Second Office Action Issued in Chinese Patent Application No. 201110192566.5", Filed Date: Mar. 24, 2016, 15 Pages.

* cited by examiner

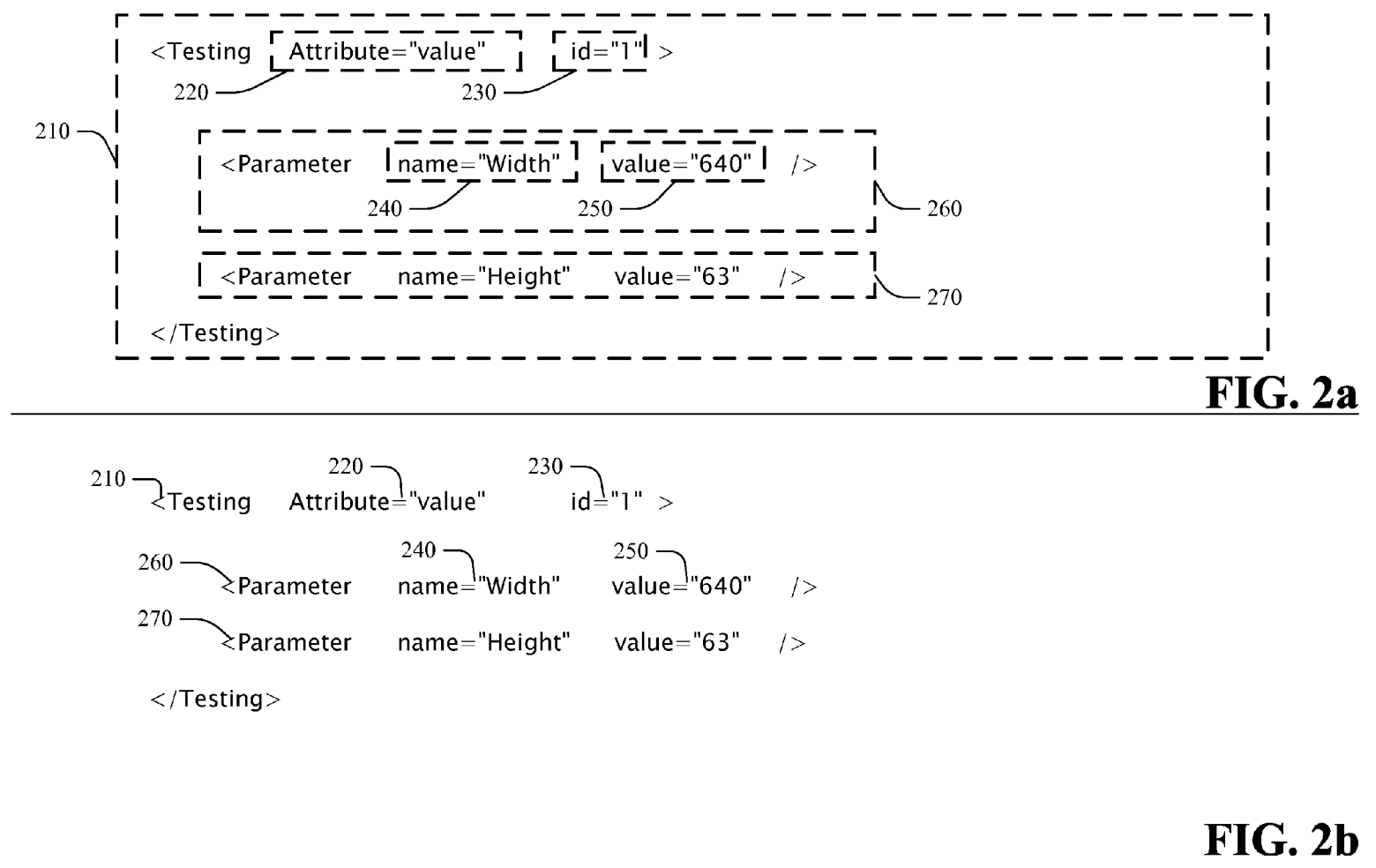

```
                                            ┌─────────────────────────────────────────────────┐
                                            │                                          ┌─260  │
                                            │                                          ┌─270  │
                                            │                            ┌ ─ ─ ─ ─ ─ ─ ─ ─ ─ ┐│
                                            │                 ┌─"┐ ┐     │       ┌"640"┐      ││     ┌"63"┐
                                            │   ┌Attribute="value"┐ id="1" >   │  value=    /> │  value=    />
                                            │   │ └─────────┘ └──┘ │     │       └─────┘      ││     └────┘
                                            │ <Testing                     <Parameter  name="Width"    <Parameter  name="Height"
                                            │   └──┬──┘   └────┬────┘      └────┬────┘ └──┬──┘ ││      └────┬────┘  └───┬────┘
                                            │     220         230              240  └─250─┘    ││         240
                                            │                                  └ ─ ─ ─ ─ ─ ─ ─ ┘│
                                            │   </Testing>                                      │
                                            │      └────┘                                       │
                                            │    └─210                                          │
                                            └───────────────────────────────────────────────────┘

FIG. 2a

┌"value"┐   ┌─230
                                              ┌─220    Attribute=     id="1" >        ┌─250      ┌"640"┐     ┌"63"┐
                                             <Testing                              value=            /> value=    />
                                       ┌─260 <Parameter   name="Width"
                                       ┌─270 <Parameter   name="Height"
                                       ┌─210
                                             </Testing>

FIG. 2b
```

```
<?xml version="1.0" encoding="utf-8"?>
<ad
 xmlns="urn:schemas-microsoft-com:advertisement:ad"
 xmlns:adx="urn:schemas-microsoft-com:advertisement:extension"
>
    <AdProperties ... >                 — 320
    ...
    </AdProperties>
    <Assets ... >                       — 330
    ...
    </Assets>
    <Events ... >                       — 340
    ...
    </Events>
    <Views ... >                        — 350
    ...
    </Views>
    <PluginData ... >                   — 360
    ...
    </PluginData>
</ad>
```

```
<Assets>
  <Asset  type="image/jpeg"  id="1"  src="http://www.adatum.com/ads/88712-t.jpg" >
    <Parameter  name="Width"   value="640" />
    <Parameter  name="Height"  value="63" />
  </Asset>
  <Asset type="image/jpeg"  id="2" src="http://www.adatum.com/ads/88712-f.jpg">
    <Parameter  name="Width"   value="640" />
    <Parameter  name="Height"  value="480" />
  </Asset>
  <Asset type="image/jpeg"  id="3" src="http://www.adatum.com/ads/BSS003-t.jpg">
    <Parameter  name="Width"   value="35" />
    <Parameter  name="Height"  value="480" />
  </Asset>
<!-- Cont'd in next FIG -->
```

FIG. 5

```
<!-- Cont'd from prior FIG -->
<Asset type="image/jpeg"    id="4" src="http://www.adatum.com/ads/BSS003-f.jpg" >
    <Parameter name="Width" value="640" />
    <Parameter name="Height" value="480" />
</Asset>

<Asset            type="text/plain"    id="5"    >http://www.AlpineSkiHouse.com/</Asset>

<Asset type="text/plain"    id="6">Click here</Asset>
<Asset type="image/jpeg"    id="7" src="http://www.treyresearch.net/ads/NEXK-t.jpg" >
    <Parameter name="Width" value="480" />
    <Parameter name="Height" value="49" />
</Asset>

<Asset type="image/jpeg"    id="8" src="http://www.treyresearch.net/ads/NEXK-f.jpg" >
    <Parameter name="Width" value="480" />
    <Parameter name="Height" value="640" />
</Asset>

</Assets>
```

FIG. 6

```
<Events>
    <Event id="1"  type="Url"  uri="http://www.adatum.com/ads/0adint06/7006737.10" />
    <Event id="4"  type="Url"  uri="http://www.adatum.com/ads/0adint06/7006737.11" />
    <Event id="7"  type="Url"  uri="http://www.adatum.com/ads/0adint06/7006737.12" />
    <Event id="10" type="Url"  uri="http://www.adatum.com/ads/0adint06/7006737.13" />
    <Event id="80" type="text/plain">Event 80 Text</Event>
    <Event id="99" type="MultiEvent">
        <Parameter id="80"/>
        <Parameter id="7"/>
    </Event>
    <!-- Cont'd in next FIG -->
```

FIG. 7

```
<!-- Cont'd from prior FIG -->                                                810

830  <Event id="2"   type="Url"  uri="http://www.treyresearch.net/0adint06/7006737.20"  />
840  <Event id="5"   type="Url"  uri="http://www.treyresearch.net/0adint06/7006737.21"  />
850  <Event id="8"   type="Url"  uri="http://www.treyresearch.net/0adint06/7006737.22"  />
860  <Event id="11"  type="Url"  uri="http://www.treyresearch.net/0adint06/7006737.23"  />

820
870  <Event id="3"   type="Url"  uri="http://www.contoso.com/ads/qzi/7006737.37"   />
880  <Event id="9"   type="Url"  uri="http://www.adatum.com/ads/438T/7006737.97"   />
890  <Event id="12"  type="Url"  uri="http://www.treyresearch.net/0aITX/700328.61" />

</Events>  340
```

```
<Views>
910 —<View Orientation="Landscape" type="image">
920 —<Asset name="img" id="1">
970 —<Parameter name="Type" value="Thumbnail" />
    </Asset>
930 —<Asset name="img" id="2">
980 —<Parameter name="Type" value="Full" />
    </Asset>
940 —<Event name="click" id="1" />
950 —<Event name="impression" id="2" />
960 —<Event name="hover" id="3" />
   </View>
<!-- Cont'd in next FIG -->
350
```

FIG. 10

```
<!-- Cont'd from prior FIG -->
1010 — <View Orientation="Landscape" >
1020 — <Asset name="img" id="3" >
    1070 — <Parameter name="Type" value="Thumbnail" />
         </Asset>
1030 — <Asset name="img" id="4" >
    1080 — <Parameter name="Type" value="Full" />
         </Asset>
1040 — <Event name="click" id="4" />
1050 — <Event name="impression" id="5" />
1060 — <Event name="hover" id="3" minimumSeconds="2" />
      </View>
<!-- Cont'd in next FIG -->
```

```
<!-- Cont'd from prior FIG -->
1110 — <View Orientation="Portrait" type="image">
1120 — <Asset name="img" id="7">
    1170 — <Parameter name="Type" value="Thumbnail" />
    </Asset>
1130 — <Asset name="img" id="8">
    1180 — <Parameter name="Type" value="Full" />
    </Asset>
1140 — <Event name="click" id="7" />
1150 — <Event name="impression" id="8" />
1160 — <Event name="hover" id="9" />
</View>
<!-- Cont'd in next FIG -->
```

350

```
<!-- Cont'd from prior FIG -->
<View Orientation="All" type="text">              ← 1210
    <Asset name="text" id="5">                    ← 1220
        <Parameter name="Type" value="Default" /> ← 1270
    </Asset>
    <Asset name="text" id="6">                    ← 1230
        <Parameter name="Type" value="ToolTip" /> ← 1280
    </Asset>
    <Event name="click" id="10" />                ← 1240
    <Event name="impression" id="11" />           ← 1250
    <Event name="tooltip" id="12">                ← 1260
        <Parameter name="source" value="Adget-10283" />
    </Event>
</View>
</Views>
           350
```

FIG. 12

```
<PluginData>
    <XmlDataSource  Id="Location1"   [Type="inline"]   Ref="NY_Store1" >
                                            └─ 1330
        <Location>
            <title>Alpine Ski House, Buffalo, NY</title>
            <Latitude>42.344248005835 7</Latitude>
            <Longitude>-71.1408097319287</Longitude>
            <Altitude>-25.15</Altitude>
            <Vector/>
            <Address type="US">
                <Street>4567 Main Street</Street1>
                <Street2>Suite 987654321</Street2>
                <Street3></Street3>
                <City>Buffalo</City>
                <State>NY</State>
                <PostalCode>98052</PostalCode>
                <Region>Mount Rainier County</Region>
            </Address>
        </Location>
    </XmlDataSource>
<!-- Cont'd in next FIG -->
```

FIG. 13

```
<!-- Cont'd from prior FIG -->

1410 —— <XmlDataSource Id="Contact" Type="inline"   References="true"  >
              <Contact version="1.0">                              1430
                <Title>Dr.</Title>
                <FirstName>Jacek</FirstName>
                <LastName>Myrcha</LastName>
                <Company>Alpine Ski House</Company>
        1420 —<Address Type="InternalRef" Ref="NY_Store1"/>
                <BusinessFax>+12025550329</BusinessFax>
                <BusinessPhone>+12025550835</BusinessPhone>
                <EmailAddress>Jacek@AlpineSkiHouse.com</EmailAddress>
              </Contact>
           </XmlDataSource>

<!-- Cont'd in next FIG -->
```

FIG. 14

```
<!-- Cont'd from prior FIG -->
1510 —>XmlDataSource Id="Contact" Type="inline">
    <Contact version="1.0">
        <Title>Dr.</Title>
        <FirstName>Jacek</FirstName>
        <MiddleName>Tomasz</MiddleName>
        <LastName>Myrcha</LastName>
        <Company>Alpine Ski House</Company>
        <BusinessStreet>4567 Main Street</BusinessStreet>
        <BusinessStreet2>Suite 987654321</BusinessStreet2>
        <BusinessStreet3></BusinessStreet3>
        <BusinessCity>Buffalo</BusinessCity>
        <BusinessState>NY</BusinessState>
        <BusinessPostalCode>98052</BusinessPostalCode>
        <BusinessCountryRegion>Mount Rainier County</BusinessCountryRegion>
        <BusinessFax>+12025550329</BusinessFax>
        <BusinessPhone>+12025550835</BusinessPhone>
        <EmailAddress>Jacek@AlpineSkiHouse.com</EmailAddress>
    </Contact>
</XmlDataSource>

<!-- Cont'd in next FIG -->
```

```
<!-- Cont'd from prior FIG -->
1610 — <XmlDataSource Id="Closest_Store" Type="ADatumLocator">
1620 — <Location Type=Url Uri="http://www.adatum.com/LocatorService/ads/123">
          <Parameter name="Latitude"    ~ 1630
          <Parameter name="Longitude"   ~ 1640
        </Location>
      </XmlDataSource>
1650 — <XmlDataSource Id="Contact" Type="Inline" References="true">
1660 — <Contact version="1.0">
          <Title>Customer Service</Title>
          <Company>Alpine Ski House</Company>
1670 — <Address Type="InternalRef" Ref="Closest_Store">
          <BusinessPhone>+18885551212</BusinessPhone>
          <EmailAddress>CustomerService@AlpineSkiHouse.com</EmailAddress>
        </Contact>
      </XmlDataSource>

</PluginData>
```

FIG. 16

INTERACTION BETWEEN ADS AND APPLICATIONS

CROSS-REFERENCE TO RELATED APPLICATION(S)

This application is related to U.S. patent application Ser. No. 12/061,503, filed Apr. 2, 2008, titled "INTERACTIVE HOST-AWARE ADVERTISING", which is incorporated herein by reference in its entirety; This application is related to U.S. patent application Ser. No. 12/242,406, filed Sep. 30, 2008, titled "ADAPTIVE RUN-TIME ADVERTISEMENTS", which is incorporated herein by reference in its entirety; This application is related to U.S. patent application Ser. No. 12/506,762, filed Jul. 21, 2009, titled "OPTIMIZING ADS BY CUSTOMIZATION FOR A TARGET DEVICE", which is incorporated herein by reference in its entirety; This application is related to U.S. patent application Ser. No. 12/614,457, filed Nov. 9, 2009, titled "SOCIAL BROWSING", which is incorporated herein by reference in its entirety.

BACKGROUND

Advertisers may submit an advertisement ("ad") set to a publisher. An ad set is a pre-bundled set of elements that make up an ad to be presented in the same way to all recipients. An ad set may be based on a most common denominator of the intended target recipients. For example, the ad set may be created in a way that works for the highest number of recipients.

Similar to the traditional print advertising model, the vendor may pay for these ad sets based upon the number of "impressions" (exposure to a particular advertisement) the ad receives. For example, a traditional print magazine may charge based on the number of subscribers, as that can be nearly directly translated into an estimated number of impressions. In online advertising, the metrics for impression may be more precise, such as by considering the number of times the ad was sent to a target device or audience.

SUMMARY

The following is a brief summary of subject matter that is described in greater detail herein. This summary is not intended to be an extensive overview of the disclosure, is not intended to identify either key/critical elements of the claims or disclosure, is not intended to delineate the scope of the invention, and is not intended to be limiting as to the scope of the claims or the disclosure.

Described herein are various technologies pertaining to ads. For example, described herein are interactions of ads with applications on computing devices, customization of ads, adgets with multiple Views, and loop closure between an ad target and the advertiser.

Other aspects will be appreciated upon reading and understanding the attached figures and description.

DESCRIPTION OF THE DRAWINGS

The present description will be better understood from the following detailed description read in light of the accompanying drawings, wherein:

FIGS. 2a and 2b each illustrate an example of a same XML element using two equivalent methods of attaching reference numbers.

FIG. 3 illustrates an example generalized adget data structured as XML.

FIGS. 5-6 illustrate an example generalized Assets data structured as XML.

FIGS. 7-8 illustrate an example generalized Events data structured as XML.

FIGS. 9-12 illustrate an example generalized Views data structured as XML.

FIGS. 13-16 illustrate an example generalized PluginData data structured as XML.

Like reference numerals are used to designate like parts in the accompanying drawings.

DETAILED DESCRIPTION

Figure 1:
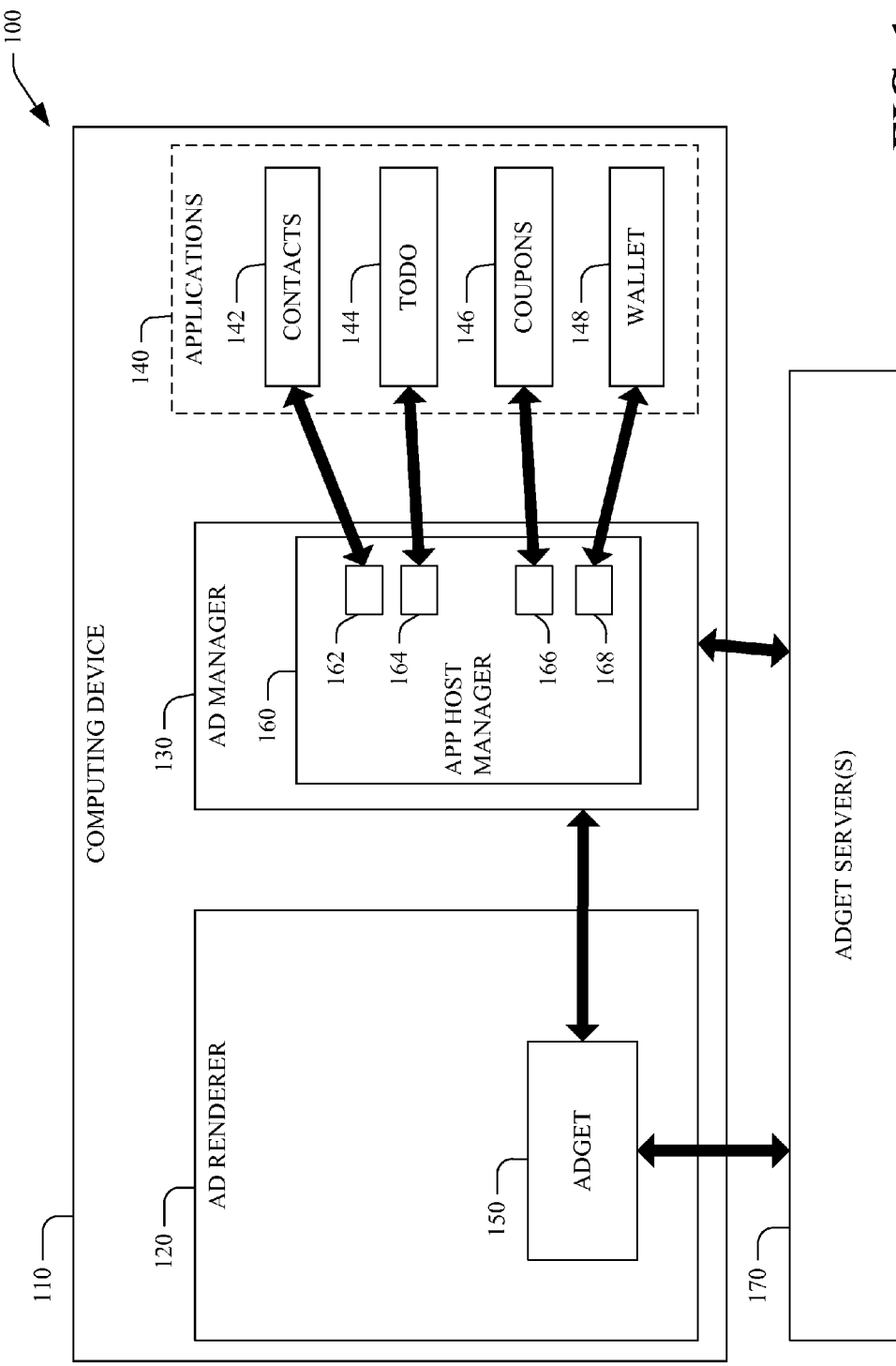
FIG. 1 illustrates an example generalized functional block diagram of a generalized example system for delivering, rendering, and interacting with advertising.

The detailed description provided below in connection with the appended drawings is intended as a description of the present examples and is not intended to represent the only forms in which the present example may be constructed or utilized.

Any example in text, visual, or other form is provided as an example, and without limitation. It should be recognized that, for examples with multiple options given in either alternative (or) or combination (and) form, not all such options are necessarily essential. Furthermore, any, all, or none of those options may be used in combinations not explicitly listed. The terms "include only" and "includes only" are limiting. In contrast, the terms "include" and "includes" are not limiting, and should be read as "include, without limitation," or "includes, without limitation" respectively. The term "in one implementation" is not limiting, and should be read as "in at least one implementation, without limitation,". The terms "e.g.", "such as", and "for example" are not limiting, and should be read as "In at least one example, without limitation". The term "may" is not limiting, and should be read as "may, but is not required to,". However, for readability, the shorter forms of these expressions may be used below.

A uniform resource identifier (URI) (also called an international resource identifier (IRI)) is data which identifies a name or a resource. For example, a URI may be a uniform resource locator (URL), a uniform resource name (URN), or both a URL and URN. Examples of URIs include "http://www.contoso.com/", "#FAQ01", "urn:issn:1234-5678", "\\www.WoodGroveBank.com\Resource.txt", "..\..\resource.txt", and "\\www.WoodGroveBank.com\FAQ.html#FAQ01".

A URN defines an identity for an item, while a URL provides a method for finding an item. In some implementations, a URI may be based on a predefined URI scheme (e.g. HTTP, FTP). In some implementations, a URI may include relative URLs, URI references, and/or fragment identifiers. In some implementations, a fragment identifier may be an identification of a portion of a resource referenced by a URI.

The term "render" includes causing visual, auditory (sound), somatosensory (tactile), gustatory (taste), and olfactory (smell) indicators, such as those detectable by a typical person, or specifically those detectable by the particular user.

Descriptions of the layout of data (e.g., a data structure) are provided as examples, and without limitation. By default, a description of a first data that includes or contains a second data includes both direct and indirect inclusion. When a second data is explicitly described using the term "directly" in reference to a first data (e.g. "the first data directly contains the second data", "the second data is directly included in the first data"), the layout of the first data requires the second data to be entirely enclosed within the first data (e.g. the second data is a part of the first data). When a second data is explicitly described using the term "indirectly" in reference to the first data (e.g. "the first data indirectly contains the second data", "the second data is indirectly included in the first data"), the layout of data requires that an indicium of the second data, other than the second data itself, to be entirely enclosed within the first data (e.g., an identifier of the second data is included in the first data, a URI). However, for clarity, this document may simply describe this relationship in one manner (e.g. having, containing, referencing, listing). In all cases, unless either the term "directly" or "indirectly" are used, both indirect and direct methods are disclosed.

The description may set forth example data structured as XML. However, such examples do not limit the data structure to XML. The same, functionally equivalent, and/or structurally equivalent data structures may be accomplished by different examples. Basic XML terminology is as follows, and will be helpful in reviewing the illustrative drawings of XML. An example portion of XML is as follows: <Element1 Attribute1="Attribute1Value" Attribute2='Attribute2Value'>
    <Element2></Element2>
    <Element3 Attribute3="Attribute3Value"/>
</Element1>

The above XML shows an XML element with a start tag of "Element1" and an end tag of "/Element1". Element1 has two attributes (Attribute1 and Attribute2), and contains two child elements (with tags of Element2 and Element3). Each of Element2 and Element3 has a parent element, specifically, they both have a parent of Element1. Element2 and Element3 are peer elements, as they have the same parent element. Each attribute has an associated attribute value, as shown in either single or double quotation marks following the "=" symbol. For example, the Attribute3 has a value of "Attribute3Value". An element may indicate its end by an end tag identical to the start tag, except preceded by the "/" character (e.g., <Element2> to </Element2>, <Element1 ... > to </Element1>). An element without child elements may indicate its completion by a "/" character preceding the closing angle bracket (e.g., <Element3 ... />). It should be understood that an example showing an attribute may instead use a contained element to provide the same or equivalent functionality (and vice versa).

It is also noted that examples herein may list multiple XML elements of a single type as contained within an XML element of a similar but plural name. For example, multiple Cat elements may be contained within a Cats element. However, the same or equivalent functions and sequences may be accomplished without the use of the plural named element. For example, the multiple Cat elements may be listed as peers without the containing Cats element. Similarly, examples herein may list a single XML element. However, the single XML element may instead be multiple peer XML elements with the same tag. Thus, singular XML element examples should be understood to also allow multiple peer elements of the same tag, and multiple peer elements with the same tag should be understood to allow a single element of the same tag.

The description sets forth the functions of the examples and the sequence of operations and/or sequences for constructing and operating the examples. However, the same or equivalent operations, functions, and/or sequences may be accomplished by different examples.

While example operational flows are shown as including multiple discrete steps or acts, it should be recognized that in some implementations at least some steps or acts may be combined or executed contemporaneously. It should also be recognized that not all steps or acts described in a given sequence are necessarily essential, that functionality that is described as being carried out by certain system components may be performed by multiple components, and that a single component may be configured to perform functionality that is described as being carried out by multiple components.

The descriptions of each of the figures below may be made with reference to other figures. However, it should be understood that these references to other figures are not intended to limit the examples to being used with the elements described with reference to those other figures.

Advertisers may submit an advertisement ("ad") set to a publisher. An ad set is a pre-bundled set of elements that make up an ad to be presented in the same way to all recipients. There may be one-time costs (e.g., production, distribution, and administrative costs) associated with creating each ad set.

An ad set may be based on a most common denominator of the intended target recipients to minimize the costs of an ad campaign. For example, the ad set is created in a way that works for the highest number of intended recipients. These ad sets may be based on a most common denominator of the intended recipients.

Similar to the traditional print advertising model, the vendor may pay for these ad sets based upon impression metrics, such as the number of "impressions" (exposure to a particular advertisement) the ad receives. For example, a traditional print magazine may charge based on the number of subscribers, as that can be nearly directly translated into an estimated number of impressions. In online advertising, the impression metrics may be more precise. Examples of online delivery metrics include the number of times the ad was sent to a target device or audience, the number of times the ad was rendered or displayed to the user, the number of times the ad was interacted with, statistics on mouse movement relative to the advertisement (e.g. mouse-over events, mouse velocity relative ad placement), and the length of time an ad was rendered.

Vendors hope that the ads create, in the mind of the recipient viewer, sufficient correlation between the ad and what is advertised. To increase this relationship, vendors may increase the number of impressions. Because vendors may pay based on the number of impressions, this may also increase the cost of the ad campaign. Increasing the number of impressions may also require broadening the intended audience to achieve the impression goal within the ad campaign's active time period. Broadening the intended audience may require creating the ad set to be targeted towards a more generalized user (which tends to be less effective at generating interest), or may require creating additional ad sets to cover the intended audience sufficiently (which may add additional one-time creation costs and/or ongoing management costs per ad set).

A single user may have a number of devices. Thus, even when targeting a small audience, creating an ad set for every combination of product, target device, and intended recipient (or intended recipient group) may be cost prohibitive. For example, the ad delivery system may incur a cost for identifying a profile associated with a request for an advertisement, analyzing the profile to match it with an appropriately targeted advertisement, and providing the advertisement in response to the request. For example, both creating ad sets and managing ad sets have an associated cost. Increasing the number of ad sets or the number of ad sets delivered to end users may increase costs, and thus may reduce the number of impressions that may be purchased on a given budget.

Furthermore, these ad sets may fail to close the loop between the user and the advertiser at the time the ad is being displayed. These ad sets may fail to close the loop between the advertiser and the user at a time when the ad is no longer being presented to the user. For example, if an ad is shown to a user in a web page, when the user navigates to a different web page, navigates to a different web site, or when the user closes the web browser, the opportunity for the user to interact with the advertisement may be lost.

Accordingly, this application may disclose one or more processes, arts, methods, machines, articles of manufactures, compositions of matter, and/or material which improve the delivery of content such as advertisements.

Although the present examples may be described and illustrated herein as being implemented in a computing system, the system described is provided as an example and not a limitation. As those skilled in the art will appreciate, the present examples are suitable for application in at least a variety of different types of computing systems, computing devices, processes, and articles of manufacture.

An example of one implementation will first be described. In this example, a user (John) wants to remember to find and visit a local Alpine Ski House in preparation for the upcoming winter ski season. While John is browsing a website on his phone, an adget is provided by an ad server to John's mobile device. The ad renderer renders the advertisement in portrait mode for John's screen, which has a resolution of 320×240, as described in one View in the adget.

John slides out the phone's keyboard, causing the display to switch to landscape orientation of 240×320. The ad renderer renders the advertisement in landscape mode for John's screen, using different Assets which are optimized for a landscape orientation at 240×320 resolution, as described in a second View in the adget.

Continuing this example, the advertisement is a coupon for use at Alpine Ski House, offering a 50% discount on extended warranty services through Humongous Insurance, but only if he buys skis at Alpine Ski House in the next two weeks. John thinks this might be interesting, so he clicks on the rendered adget. Based on the results of querying some adget plugins for supported Actions, the ad renderer then provides John three options: (1) add the advertiser to his contact list, (2) add the coupon to John's electronic coupon book, and (3) adds a coupon reminder to John's to-do list.

John selects all three options, and thus now has a contact list item on his phone for Alpine Ski House, a coupon, and a reminder to use the coupon. In this example, based on John's indication of interest, the adget and an indicia of these three items are synchronized to John's other devices (including his in-car GPS unit, his home desktop computer, and his laptop computer).

As John travels in his car the next day, based on the to-do list item, John's GPS unit detects that John is within ½ mile of an Alpine Ski House where he can redeem his coupon. However, the GPS unit does nothing due to having 13 days remaining for the to-do list item. One week later, the GPS unit once again determines it is now again within ½ mile of an Alpine Ski House, and that only 6 days remain for the coupon. Therefore, the GPS unit automatically renders the to-do list item to remind John of the coupon. John dismisses the notification as he's on his way to the airport and in a bit of a hurry.

John boards a plane at the airport and politely complies with instructions to turn off his mobile phone. Upon arrival in the new city, John has some extra free time, and thus loads his contact list to find a local Alpine Ski House. He chooses the "Dynamic Location" option in the contact list, resulting in his (retrieving and) calling the store closest to his current location. Confirming that they have the skis he is interested in, John then conveniently uses the location of that closes store to map his walk to this nearby store. He looks the skis over, and determines that he will definitely buy them. However, he delays the purchase as he's not fond of having skis as checked luggage on an airline.

Four days later, having finished his trip and returned home, John is logged onto his home desktop computer. John's desktop has different capabilities than either the GPS unit or his mobile phone, including a high-resolution display, hardware accelerated 3D stereoscopic video capability, and a printer. John also has different adget plugins on this device. For example, John's desktop computer includes a printing-related adgets plugin, which would not be applicable to his in-car GPS unit as it does not have a printer.

John clicks on the to-do list reminder (currently indicating 1 day remains for the coupon), and then on an icon for the adget. Based on his desktop's different capabilities and/or adget plugins, John is provided different options from the same adget originally downloaded on his mobile phone. John is given the option of viewing Alpine Ski Hut's product lineup as high-resolution 3D models, printing the coupon on his printer, and adding Alpine Ski Hut to tomorrow's list of errands. John adds it to his errand list for tomorrow, and this errand list is synchronized to his car GPS unit (complete with an indication of the adget).

The next day (the last day of the coupon), John gets in his car. The GPS unit automatically calculates the best routes to complete John's errands. When parsing the errand list item for Alpine Ski Hut to use the coupon, the GPS unit parses the adget to determine a best location to drive to. In this case, of the three local shops, one is right next door to John's bank and is thus automatically selected as a best result to map to. John purchases the skis, uses his electronic coupon to get the discounted extended warranty, and uses his electronic wallet to pay for both.

Therefore, in this example, John interacted with a single delivered adget multiple times, on multiple different devices, and using different Views on the different devices. The single adget resulted in different available Actions based on the device's capabilities, and the adget stayed available even after cycling power to his device (e.g. the phone on the plane). This single adget thus helped John to remember to use his special offer, closing the loop between the advertiser and the user at a time long after the original ad was delivered, and long after the original ad impression occurred.

FIG. 1 illustrates an example generalized functional block diagram of portions of an example system 100 that can be used to (i) enable ad information to be retained beyond the time the ad is rendered, (ii) enable advertisers to provide adgets (advertising gadgets) in a live, targeted, and secure manner, (iii) enable ongoing interaction with advertisers, and (iv) enable context-based interaction with advertisers.

In the example illustrated in FIG. 1, a computing device 110 includes an ad renderer component 120, and ad manager component 130, and a plurality of application components 140. Examples of application components include a contact list component 142, a to-do list component 144, a coupons component 146, and a wallet component 148.

The computing device 110 may be communicatively connected with one or more adget servers 170. In one implementation, the adget servers 170 may provide an adget (an advertisement gadget) 150 to the ad renderer component 120. The ad renderer component 120 may provide the adget 150 to the ad manager component 130. In one implementation, the adget servers 170 provide an adget 150 to the ad manager component 130. The ad manager component 130 may provide the adget 150 or an indicium of the adget to the ad renderer component 120.

The ad manager component 130 provides a common interface for an ad renderer component 120 to interact with the adget 150. The ad manager component 130 may be executing with greater user trust than an advertiser which authored the adget 150 would run with.

The ad manager may select a security permission based on an adget property or an adget plugin property. Examples of adget properties include an author of the adget, a company associated with the adget (e.g., the advertiser), a publisher of the adget, a specific advertisement identifier, and a digital signature of the adget. Examples of adget plugin properties include an author of the adget plugin, a company associated with the adget plugin, a publisher of the adget plugin, a digital signature of the adget plugin, and a predetermined Action an adget plugin supports.

A security permission for a portion of the adget (e.g., an Event or Action) may be different than a default security permission of the Adget. These different security permissions may be based on an adget property, an adget plugin property, or a property specific to the portion of the adget (e.g., an Event property for an Event).

A security permission may be different than the security permission for the component processing the adget. For example, the security permissions may be less than those of the component processing the adget (i.e., reduced permissions). The ad manager may provide a security "sandbox" in which the adget is parsed and executed. A security sandbox protects or otherwise mitigates threats to a system from an advertisement which (either maliciously or by error) would negatively affect the computing device. In one implementation, the security sandbox is used when the Action has at least one reduced permission.

The ad manager component 130 may include an app host manager component 160. An app host manager component 160 provides a framework for allowing application components 140 to register one or more adget plugin components 162, 164, 166, 168. Registering an adget plugin component 162 indicates to the app host manager component 160 that the adget plugin component 162 can parse adgets. An adget plugin indicates support for one or more Actions. An adget plugin may parse an adget before indicating support for an Action. An adget plugin may provide an indication of support for multiple Actions (e.g. Multiple Actions for a single adget, always supporting at least two Actions, or combinations of always supported Actions and adget based Actions).

In one implementation, the ad manager component 130 has a predetermined list of Actions that are supported by the ad manager. In one implementation, the ad manager component 130 may provide an adget 150 to multiple adget plugins 162, 164, 166, 168, and receive an indication that more than one adget plugin (e.g., 164, 166) supports a particular Action (e.g., coupon; Actions are described in more detail below).

In one implementation, when multiple adget plugins support a particular Action, the ad manager component 130 may select a single plugin based on an adget plugin priority indicium. Examples of adget plugin priority indicia include the order the adget plugin was registered, a predetermined list of adget plugins, a user preference (positive or negative) for an adget plugin, existence of a digital signature for the adget plugin, identity corresponding to a digital signature for the adget plugin, validity of a digital signature for the adget plugin, and correlation between adget plugin identity and advertiser identity.

In one implementation, the ad manager component 130 may enable all supported plugins for the Action. In one implementation, the ad manager component 130 may provide an indicium of multiple adget plugins supporting an Action, and may provide the user a means to select the preferred adget. In one implementation, the ad manager component 130 may cause multiple adget plugins to execute a given Action in series or in parallel. In one implementation, the ad manager component 130 may determine an order of executing multiple adget plugins in series based on an adget plugin priority indicium.

An ad manager component 130 may limit an adget plugin component to a limited set of tightly controlled resources and communications. Limiting an adget plugin component may enable the adget plugin to execute untrusted, or partially trusted, code. An Ad Manager may vary the capabilities exposed to an adget plugin based on an adget plugin trust factor. Examples of adget plugin trust factors include a security permission for the adget plugin, being listed on a predetermined list of adget plugins, an explicit or implicit user preference (positive or negative), validity of a digital signature for the adget plugin, an identity corresponding to a digital signature for the adget plugin, correlation between an adget plugin identity and an installed application, and correlation between an adget plugin identity and an identity corresponding to the adget.

The ad manager component 130 may provide a manner in which to exit a security sandbox in which an adget is being parsed. An adget plugin component may parse an adget in a security sandbox. The format of the Action returned by an adget plugin to an ad manager component 130 may be predefined to reduce a risk of executing untrusted code (e.g., a non-executable data structure, such as an XML data structure describing an Action to occur). The non-executable data structure may include all the information from the adget which the adget plugin requires to execute the Action. For example, the non-executable data structure may contain an indicium that the Action is a 50% off coupon, having a start date, an end date, and a coupon ID, in a format which the adget plugin component parses to cause the Action to occur. In one implementation, the ad manger component 130 may process an Action in a security sandbox on behalf of other components, such as an ad renderer component.

The ad manager component may choose to not use an adget based on an adget restriction setting. Examples of adget restriction settings include validating the Action conforms with one or more technical restrictions (e.g. validating an XML adget against a schema), user restrictions (e.g., no Events causing rendering operations between 10 pm and 8 am), and user preferences (e.g., no advertisements from Coho Vineyard).

An Action is a predetermined functionality which an adget plugin component may support. Examples of an Action include device Actions, instructive Actions, and tempting Actions. A device Action is an action which causes the device to perform a function, such as "Dial" (dial a phone number), "IM" (send an instant message"), and "Vote" (cast a ballot). An instructive Action is an action which causes the device to provide information to the user, such as "Map" (show map of location), "Directions" (show directions to location), and "Weather" (show weather). A tempting Action is an Action which attempts to entice a user to perform an action, such as "Coupon" (entice to purchase), "Learn More" (educate the user), "Buy local now" (e.g., entice user to purchase through finding a local retailer with item in-stock), "Download" (e.g., free image to brand user's device with logo).

FIGS. 2a, 2b each illustrate an example of the same sample XML element, using two equivalent methods to attach reference numbers. In these illustrations, there is a testing element 210. The testing element 210 has two attributes 220, 230. The testing element 210 has two child elements 260, 270. Thus, child elements 260 and 270 are peer elements. Child element 260 has two attributes 240, 250. The use of dotted line boxes as shown in FIGS. 2a and 2b may be used when more clear. For example, 210 uses the dotted line box in FIG. 2b. As shown in FIG. 2b, a reference number attached to an opening bracket (e.g. 210, 260, 270) indicates the entire element (and any child elements). A reference number attached to an equals sign within an element (e.g. 220, 230, 240, 250) refers to the attribute (both the attribute name to the left, and the corresponding attribute value to the right). Similarly, it is to be appreciated that 240 may also be referred to as follows: "element 260's name parameter".

FIG. 3 illustrates an example adget data structured as XML element 300. An adget data structure 300 may include an Ad Properties element 320. An adget data structure 300 may include an Assets element 330. An adget data structure may include an Events element 340. An adget data structure may include a Views element 350. An adget data structure may include a PluginData element 360. More detailed examples of each is described in more detail below with reference to FIGS. 4-16.

An adget 150 may include one or more adget resources, and/or one or more indicium of adget resources. The one or more adget resources may include a static adget resource and/or a dynamic adget resource. A static adget resource is data that does not change during the use of the adget. Examples of static adget resources are resources included with the adget (e.g., a resource embedded in the adget, a file stored with the adget) and an indicium of a URI to download an unchanging data file. A dynamic adget resource is an adget resource that, for a given adget, may change each time it is retrieved. (e.g., based on a dynamic adget resource parameter). Examples of dynamic adget resource parameters include a user identifier, a statistically unique identifier (e.g., a GUID), location data (e.g. GPS coordinates, altitude, geographical location such as city, state, or country), time, user identifier (e.g. user identity, user identification, or user authentication evidence), and temperature.

Figure 4:
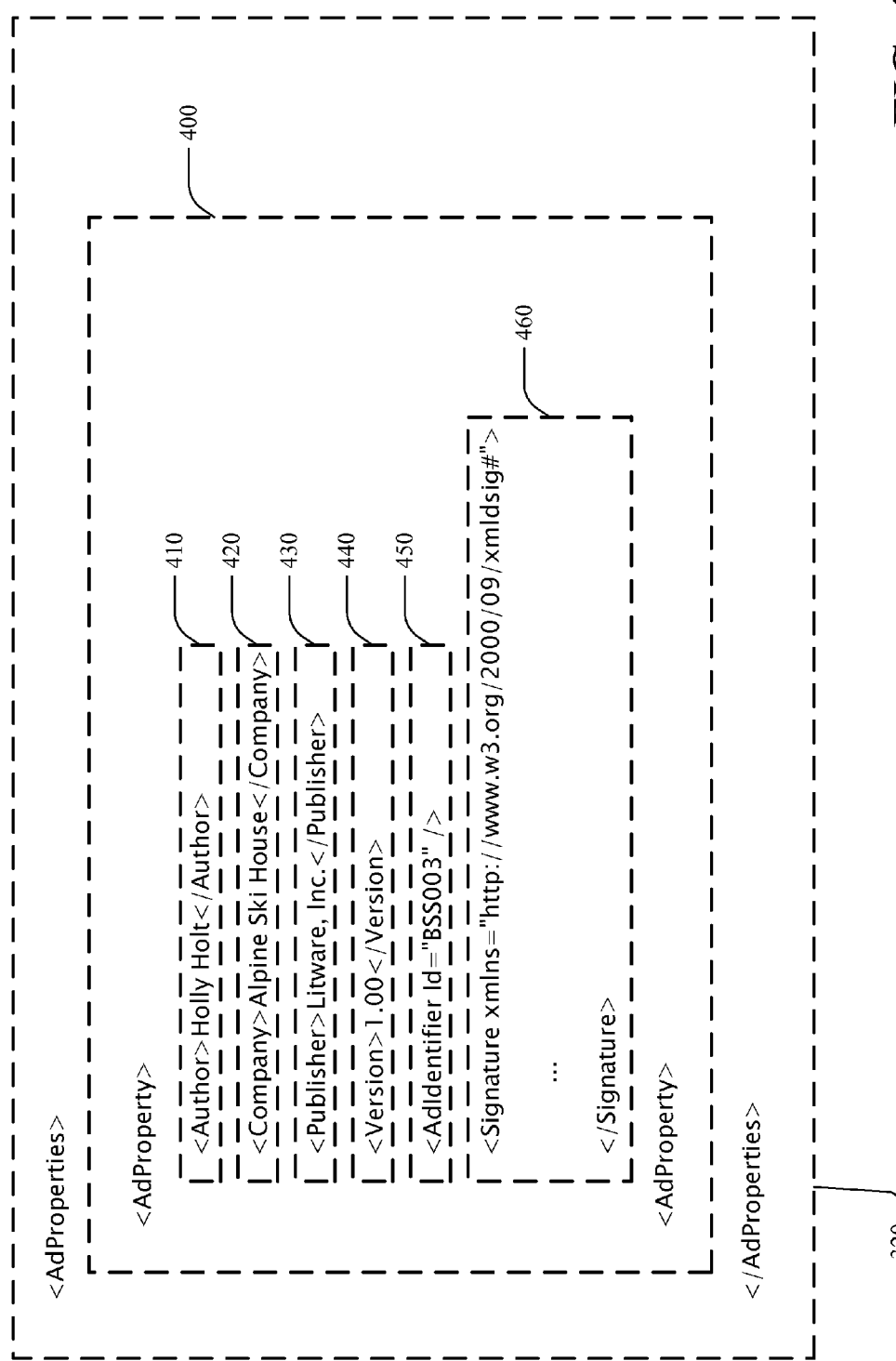
FIG. 4 illustrates an example generalized AdProperties data structured as XML.

FIG. 4 illustrates an example AdProperties data structured as XML 320. An AdProperties element 320 may include an AdProperty element 400. An AdProperty element 400 provides data about the adget data structure. An example of this data includes identities associated with the adget data structure, such as identities involved in the creation, publishing, distribution, and/or providing an underlying offer of the advertisement. In this example, a single AdProperty element include multiple of these information, including an Author element 410, a Company element 420, a Publisher element 430, a Version element 440, an AdIdentifier element 450, and a Signature element 460.

An Author element 410 may contain a plain text version of the author's name. An Author element 410 may be a URI such as a URN. An Author element 410 may be a trademark, copyright, digital signature, or other indicium of authorship.

A Company element 420 may contain a plain text version of a company name. In one implementation, the company name corresponding to the Company element 420 is the company whose goods or services are being marketed by an advertisement the adget 300 is configured to render. The Company element may contain a trademark, copyright, digital signature, or other indicium of the company's relationship to the adget 300.

A Publisher element 430 may contain a plain text version of a publisher's name. In one implementation, the publisher's name corresponds to the publisher of the adget 300. A publisher element may contain a trademark, copyright, digital signature, or other indicium of the publisher's relationship to the adget 300.

An AdIdentifier element 450 may provide a globally unique, semi-unique, or statistically unique (collectively, "unique") identifier for the adget 300. Examples of semi-unique identifiers are identifiers which are unique for a specific identity (e.g., company, publisher, author), specific timeframe (e.g., the time the ad campaign is running), or specific geographic region (e.g., a country, a continent).

A Signature element 460 may conform to the Feb. 12, 2002 W3C Recommendation for XML digital signatures. A Signature element may apply to some or all of the adget data structure 300. A Signature element 460 may exclude all AdProperty elements other than the AdProperty element 400 containing the Signature Element 460 (e.g., to allow multiple signatures applied in any order). Typically, a Signature Element 460 excludes the Signature Element 460 from the data which is being signed.

FIGS. 5-6 illustrate an example Assets data structured as XML 330. An Assets element 330 may include an Asset element 510, 560, 580, 610, 620, 660, 670, 680. An Asset element 510 contains a resource that may be used during the rendering of the advertisement. An Asset element 510 may include an Asset type indicium (e.g., 512, 630), an Asset unique identifier (Asset unique ID) (e.g., 514, 640), and/or an Asset retrieval indicium 516.

Examples of Asset type indicia 512 include visual types, auditory types, gustatory types, olfactory types, Multipurpose Internet Mail Extension types (MIME types), and enumerated values selected from a predetermined list. Example Asset elements 510, 660, 580, 610, 670, 680 each have an Asset type indicium of "image/jpeg" (e.g., 512), corresponding to the MIME type for a picture file of a specific format. Example Asset elements 660, 670 have an Asset type indicium of "text/plain" (e.g., 630), corresponding to the MIME type for information encoded as plain text data.

Examples of Asset unique ID 514 include a Globally Unique Identifier (GUID), a number, and a string. In the example Assets shown in FIGS. 5-6, the Asset elements are assigned Asset unique IDs in consecutive increasing numbers starting at either zero or one. Asset elements may have non-contiguous Asset unique ID values.

An Asset retrieval indicium 516 may include a URL. An Asset retrieval indicium may include a URI. An Asset element 620 may includes the Asset directly within the element. Example Asset element 620 directly includes the plain text value of "http://www.AlpineSkiHouse.com/" as the Asset.

An Asset element 510 may contain an Asset parameter element (e.g., 520, 518). An Asset parameter element may provide additional information about a resource without requiring retrieval and/or parsing of that Asset. An Asset parameter element may contain metadata about the Asset. Example Asset parameter element 520 has a name attribute 522 of "Width", and a value attribute 524 of "640".

Referring to the illustrated examples of FIGS. 5-6, the following additional descriptions of the example data may be helpful:

Asset element 510 refers to an image 640 pixels wide and 63 pixels high (e.g., similar to a horizontal banner ad). Asset element 560 refers to an image 640 pixels wide and 480 pixels high (e.g. a full-screen ad for a 640×480 portrait screen).

Asset element 580 refers to an image 35 pixels wide and 480 pixels wide (e.g., similar to a vertical banner ad). Asset element 610 refers to an image 640 pixels wide and 480 pixels high (e.g. a full-screen ad for a 640×480 portrait screen).

Asset elements 620 and 660 refer to plain-text Assets without specific pixel dimensions (although other plain-text attributes or child elements such as preferred or required font(s) may be indicated).

Asset element 670 refers to an image 480 pixels wide and 49 pixels wide (e.g., a narrow horizontal banner ad). Asset element 680 refers to an image 480 pixels wide and 640 pixels high (e.g. a full-screen ad for a 480×640 landscape mode screen).

The example Assets element illustrated in FIGS. 5-6 thus contains eight Asset elements 510, 560, 580, 610, 620, 660, 670, and 680 with explicit Asset unique IDs numbered respectively one through eight.

Examples of a unique identifier include an explicit unique ID and an implicit unique ID. In one implementation, some or all unique IDs are implicit unique IDs. In one implementation, a unique ID may be based on a counter. Examples of counters include a shared counter that is incremented for each implicit ID required, an element-specific counter (e.g. a counter for Asset unique IDs), a byte offset within a canonicalized data representation, or any other suitable unique value.

An implicit unique ID may be based on the order in which the element is listed, such as starting at a predetermined value (e.g. 0 or 1), and incrementally increasing. An implicit unique ID may be based on both a counter and a prior Asset unique ID. An explicit unique ID may set the counter to the value of the explicit unique ID. For example, an explicit Asset unique identifier may have a value of 9fabd0564b35, and the next two listed Assets may have implicit Asset unique IDs of 9fabd0564b36 and 9fabd0564b37, respectively.

FIGS. 7-8 illustrate an example Events data structured as XML 340. An Events element 340 may include an Event element (e.g., 720, 730, 740, 750, 760, 770, 830, 840, 850, 860, 870, 880, 890). These Event elements may also be referred to by various groupings of the Event elements, such as Event groups 710, 810, and 820.

An Event element 750 may include an Event element unique ID. Example Event element 750 has an Event unique ID 752. Example Event unique ID 752 is an explicit Event unique ID with a value of ten. Put more succinctly, the Event element 750 has a unique ID 752 of ten.

In one implementation, an Event element contains an Event type indicium 754. Examples of Event type indicia 754 include visual types, auditory types, gustatory types, olfactory types, Multipurpose Internet Mail Extension types (MIME types), and enumerated values selected from a predetermined list. Example Event elements 710, 810, 820 each have an Event type indicium of "Url" (e.g., 754).

Specific predetermined Event type indicia (e.g., "Url" as shown in 754) may indicate either optional or required additional parameters or child elements. In this example, a type of "Url" uses an additional parameter of "Uri" with a value indicating the URL to retrieve when the Event occurs. An Event child element may define a parameter for the Event (not shown). An Event may have an indicium of another element, such as one or more other Events, or an element of the PlugInData (described below).

Example Event elements 710, 810, 820 each have an Event type indicium of "URL" (e.g., 754) with an additional parameter indicating the URL to retrieve, and the Event element 760 has an Event type indicium of "text/plain". Example Event element 770 is a compound Event (an Event that itself causes multiple Events to occur). Example Event element 770 is indicated as a compound Event by having an Event type of "MultiEvent", with child elements indicating two Events which should occur. Thus, in some implementations, a single Event may cause multiple Events to occur.

FIGS. 9-12 illustrate an example Views data structured as XML 350. A Views element 350 may include a View element (e.g., 910, 1010, 1110, 1210). A View element may contain a View Asset element (e.g., 920, 930, 1020, 1030, 1120, 1130, 1220, 1230). A View Asset element (e.g. 920) may contain a View Asset parameter element (e.g. 970). A View element may contain a View Event element (e.g., 940, 950, 960, 1040, 1050, 1060, 1140, 1150, 1160, 1240, 1250, 1260. A View Event element (e.g., 1260) may contain a View Event parameter element.

A View element 910 describes a potential rendering of the adget. A View element may have an associated indication of optimized View settings, such as orientation (e.g., landscape, portrait, square) or display area (e.g., 320×200, 480×640, etc.). A View element may have an associated View type (e.g., image, text, video).

An optimized View setting may be an attribute of the View element indicating an orientation. As an example of XML attributes being equally expressed as XML child elements, an optimized View setting may be a child parameter of the View element indicating an orientation.

Example View element 910 has an Orientation attribute with a value of "Landscape", indicating that View 910 is optimized for use when the display is wider than it is tall. Example View element 1110 has an Orientation attribute with a value of "Portrait", indicating that View 1110 is optimized for use when the display is taller than it is wide.

A View element may include a View Asset element (e.g., 920, 930, 1020, 1030, 1120, 1130, 1220, 1230). A View Asset element describes a resource that is used to render the adget according to the View described by the View element.

A View Asset may include an id attribute. A View Asset's id attribute's value may provide a unique reference to a defined Asset. Example View Asset 1020 references the adget Asset with an id of "3", which is Asset 580.

In this illustrated example, to render aspects of View 1010, View Asset 1020 and View Asset 1030 are used. View Asset 1020 indicates Asset id 3 is used, and View Asset 1030 indicates Asset id 4 is used. Accordingly, Example View 1010 indicates the use of Assets 580 and 610 to render aspects of View 1010.

A View Asset may be associated with additional View Asset data. For example, a View Asset 1020 may have a child element 1070 which provides additional information on the use of the View Asset. Examples of additional information about the use of a View Asset include the type of the Asset, the computational complexity of decoding the Asset (e.g. as used by the view), and a rendered size of an Asset (e.g., visual dimensions in pixels).

Example View Asset 1020 has a single child element 1070, and example View Asset 1030 has a single child element 1080, with each child element being a View Asset parameter element. Example View Asset parameter element 1070 indicates the type of the parent View Asset 1020 is a thumbnail (e.g., a smaller View of the full advertisement). Example View Asset parameter element 1080 indicates the type of the parent View Asset 1030 is "full" (e.g., the full sized advertisement).

Thus, in the illustrated example, View 1010 is optimized for landscape rendering, uses Asset 580 (id 3) to render a thumbnail View of the advertisement, uses Asset 610 (id 4) to render a full View of the advertisement, and has three Events. (Events are more fully described below).

Having described the View Assets, we may now temporarily return to discussion of the View type. A View type may be an attribute of the View element indicating a type of the View, such as image, video, text, etc. A View type may be a child parameter of the View element indicating a type of the View. A View type may not be explicitly listed in the View element, but may be inferred by reference to one or more View Asset elements contained within the View.

Example View 1010 does not explicitly list the View type. Each View Asset (1020, 1030) for View 1010, as described by reference in Example Assets 580, 610, has an associated type attribute of "image/jpeg". Thus, the View type for View 1010 may be inferred to be "image/jpeg", or "image". A person of ordinary skill would understood that a View may have multiple View types, such as through inference to Assets of multiple types (e.g., "image/jpeg", "audio/x-wav", and "video/mpeg").

A View element may include a View Event element (e.g., 940, 950, 960, 1040, 1050, 1060, 1140, 1150, 1160, 1240, 1250, 1260). A View Event element may indicate a predefined View Event type (e.g., by a predetermined correlation, such as an attribute of "Name"). A View Event element may indicate a result of a View Event type occurring, such as an indication of an Event defined in the Adget.

Example View Event element 1040 has a name attribute (value of "Click") that identifies the predefined View Event type (e.g., "Click"). Example View Event element 1040 has an id attribute (value of "4") that identifies an Event to occur when the "Click" View Event type occurs. In this example, Event id 4 references Event 730, based on Event 730 having an id attribute with a value of "4". Thus, in this example, if a user clicks on the rendered advertisement, Event 730 will occur as a result.

An Event may occur without being rendered. For example, the View Event element 940 may cause Event 770 to fire upon a user clicking a mouse without rendering the Event 770. An Event may occur in addition to a default result. For example, Event 770 may fire when a user clicks the advertisement, and an app host manager may also cause a plurality of Actions to render for the user.

Examples of predefined View Event types include temporal View Event types, rendering View Event types, device View Event types, biometric View Event types, and user interaction View Event types. Examples of temporal View Event types include the passage of a predetermined period of time (e.g., 30 seconds) relative to a View Event, the passage of "wall clock" time (e.g., when a real-world clock would have passed 2 minutes, even if the device was turned off for 30 of those seconds), and the passage of device time (e.g., only counting when the device is on), a specified minimum number of frames of video.

User interaction View Event types include click, gesture, hover, approach, retreat, double-click, drag, touch, change of device orientation (e.g. tilting, rotating, etc.), and detection that the user's eyes are focused at a target area.

Biometric View Event types include biometric values and changes in biometric values. Examples of biometric values include pulse rate, respiration, perspiration, skin conductivity, stress levels (e.g. to recognize hunger), blood sugar levels (e.g., to recognize hunger), and brain wave type.

Device View Events include addition of device capabilities, removal of device capabilities, changes to device capabilities, and power state changes. Examples of device capabilities include the number of rendering devices (such as a display device, a printer, a speaker, a scent mixing or scent creation unit, and the like), a mode of a rendering device (e.g., landscape mode, portrait mode), number of fingerprint sensors, count of network interfaces, type of network connectivity, and the like. Examples of power state changes are power-off, power-on, sleep, and low-power settings.

A rendering component may choose a View of a plurality of adget Views based on a View preference. A View preference may be based on a View preference parameter. Example of View preference parameters include an optimized View setting, a View type, a View Asset, a View Event, a device capability for rendering the View, a device capability for detecting a View Event, a device rendering resolution, and a user preference. A rendering component may determine a View parameter based on the specific capabilities of the current rendering device. For example, the View parameter may indicate a higher preference when a rendering output of the device (e.g. a display) matches a View setting (e.g., portrait orientation at 600×800 pixels). A rendering component may be able to immediately update the rendering of an advertisement when the device capabilities change, without obtaining a new adget from the ad server.

As an example, when a mobile phone device is rotated from portrait mode to landscape mode (e.g., when sliding out a keyboard), the same adget that was selected for the user and is displaying in portrait mode may immediately be rendered in a different fashion, using different Assets, with different Events, from the same adget provided to the same user. Using the same adget when changing display orientation allows a consistent advertisement exposure (based on the adget) to continue without interruption, while being rendered in a manner appropriate for the device. This consistent advertisement exposure may continue without additional network traffic, without additional profile lookups on an ad server, without additional ad campaign lookups on the ad server, and with improved responsiveness for the user.

FIGS. 13-16 illustrate an example PluginData data structured as XML 360. A PluginData element 360 may contain a PluginDatum data element. It should be noted that the use of the term Datum in the name PluginDatum is for naming convenience, and as described and illustrated, does not restrict the PluginDatum data to holding a single piece of data. The example illustrated shows XmlDataSource elements (e.g., 1310) as PluginDatum data. A PluginData data element contains data which may be made available to adget plugins and/or application components 140 through the app host manager component 160.

Example XmlDataSource 1310 has an attribute 1330 which indicates that the data in the XmlDataSource is stored inline (e.g., does not require data other than that within the XmlDataSource 1310). Example XmlDataSource 1410 has an attribute 1430 which indicates that the XmlDataSource 1410 (while still itself being inline) references at least one other PluginData data element. The absence of an attribute may imply a specific attribute value. Example element 1420 references the PluginData data element 1310 to provide the address information. Example XmlDataSource 1510 shows one implementation of presenting example XmlDataSource 1410 such that it does not reference other PluginData data elements.

A PluginData data may provide dynamic data. Example XmlDataSource 1610 has an attribute which indicates that the data is a custom type. In this example, the attribute Type has a value of "ADatumLocator" and contains a Location element 1620. The Location element 1620 has a type attribute of URL, and a URI attribute with the URL from which to obtain the Location data. The location element 1620 also contains two child Parameter elements 1630, 1640. Parameter element 1630 has a name attribute of Latitude and parameter element 1640 has a name attribute of Longitude. The parameter elements 1630 and 1640 may correspond to variable data which is sent as part of the URL. For example, if a plugin determined the current latitude and longitude were 43.00 and −72.00 respectively, a plugin may combine this information with the listed URL form element 1620 when accessing the URI. For example, instead of accessing http://.../ads/123, the plugin may instead access http://.../ads/123?Latitude=43.00&Longitude=−72.00. In such an implementation, the adget may define a data (e.g. latitude and longitude) used to access the dynamic data source.

A PluginData data element may indicate that it is inline. A PluginData data element may reference a different PluginData data element which is not inline. In one implementation, a PluginData data element may be inline and reference a non-inline data element. Example XmlDataSource 1650 has a Type attribute with value "inline", and a References attribute with value "true"; XmlDataSource 1650 has a child Contact element 1660; Contact element 1660 has a child Address element 1670 with a Type attribute with value "InternalRef" and a Ref attribute of "Closest_Store". In one implementation, these data indicate that the Address element should be filled in through the use of the PluginData data element with an ID of "Closest_Store". In this example, this would indicate that the Address element is provided by XmlDataSource 1610.

An adget may be a movie trailer for a movie. A movie trailer adget may include a PluginData data element which includes the premier date for the movie, when the movie begins showing (e.g., locally, nationally), and/or when the movie stops showing. Examples of supported actions may include adding a reminder for the premiere of the movie, purchasing tickets for the movie at a time open on both the user and a friend's calendar, adding the film studio as a contact in the user's contact list, browsing merchandise associated with the movie, following the advertiser's web offerings (e.g. social networking site, blog, or home page), and sending an instant message containing the adget to a friend.

Figure 17:
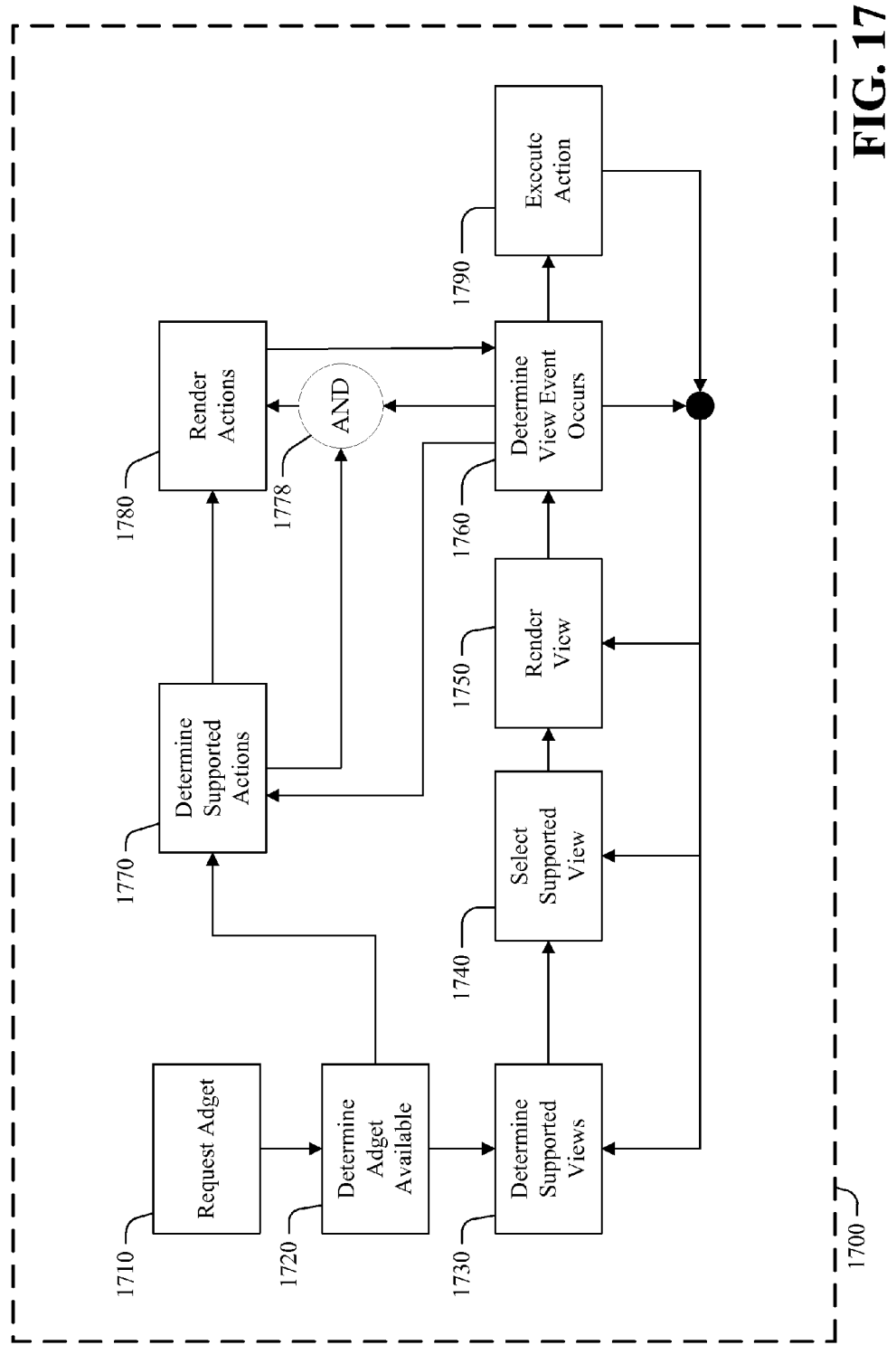
FIG. 17 illustrates an example generalized operational flow including various generalized operations that may be performed when providing interactivity between an adget and a user.

FIG. 17 illustrates an example generalized operational flow including various generalized operations that may be performed when providing interactivity between an adget and a user.

An adget may be requested as shown in requesting operation 1710. When the adget is determined as available as shown in determining operation 1720 (e.g., after downloading from ad server, retrieving from cache, detecting in computing device readable medium, etc.), a number of operations may occur in sequence or in parallel. The Views in the adget may be determined as supported as shown in determining operation 1730. A supported View may be selected as shown in selecting operation 1740. The View may be rendered as shown in rendering operation 1750.

A determination that an Event has occurred may occur as shown in determining operation 1760. The Actions supported may be determined as shown in determining operation 1770. The Actions may be rendered as shown in rendering operation 1780. In one implementation, the rendering operation 1780 is based on both the determining operation 1760 and determining operation 1770 (as shown by AND notation 1778). In one implementation, rendering operation 1780 may occur prior to a determining operation 1760. One or more actions may be rendered as shown in rendering step 1780. An Action may be executed as shown in executing step 1790. Examples of each of these steps may be discussed in more detail below.

In one example, in response to a request for an adget as shown in requesting operation 1710, an advertising campaign is selected based on a user profile associated with a request for an adget. This ad campaign selection may require one or more database lookups on the server to ensure the adget is targeted towards a user profile associated with the request. In this example, the adget is returned to a computing device as a result of the request. As an example, a computing device may determine that the adget is available as shown at determining operation 1720.

An adget may be parsed to determine what Views are supported as show in determining operation 1730. Determining operation 1730 may be based on one or more supported View factors. Examples of supported View factors include View settings associated with the View, Event View factors, Asset View factors, capability View factors, temporal View factors, environmental factors (e.g., ambient light levels), and user preferences (express or implied). In one implementation, one or more of these View factors is based on an attribute, parameter, or child element of the corresponding View node.

Examples of supported View settings associated with the View include optimized View settings of a View, orientation settings of a visual View, and resolution settings to display a visual View.

Examples of Event View factors include Event type indicia, resources required for the Event, number of Events, detectability of Events (e.g. click, impression), and capability to cause an Event to successfully occur (e.g., a computing device having network connectivity to access remote data).

Examples of Asset View factors include Asset type indicia, locality of Asset (e.g., available locally, requiring network access), and Asset parameters (e.g. width, height, volume, color scheme, theme, or parental rating).

Examples of capability View factors include capabilities of a computing device, capabilities of a computing system, and capabilities of a component of a computing system. Examples of the components of the computing system include an ad rendering component 120, an application component 140, an ad manager component 130, and an app host manager component 160). Capabilities may be current capabilities or potential capabilities. Potential capabilities may be enabled without additional user interaction (e.g., if needing to render video content at 24 frames per second, altering a refresh rate of a display component). Potential capabilities may include user interaction (e.g., a user rotating a display from landscape to portrait mode). Examples of capability View factors include device capabilities, device orientation, device battery status, hardware acceleration capability for a function (e.g., 3-D graphics or encryption functions), and device power mode.

Examples of temporal View factors include a date and/or time range (e.g. corresponding to an ad campaign), phase of the moon, season, holiday, day of week, and cumulative impression time associated with a View.

A View may be transformed into rendered form as shown in rendering operation 1750. The View may be rendered based on a predetermined selection of multiple Assets within the View. For example, the rendering operation 1750 may render an Asset with a name attribute of "img" (e.g., 920, 930) if defined by the View. A rendering operation 1750 may include selecting an Asset from multiple Assets (e.g., each associated with an identical name attribute). A rendering operation 1750 may select an Asset from multiple Assets by starting with a predetermined id attribute (e.g. "1"), by using a predetermined type (e.g., thumbnail or full image), or by randomly selecting from the multiple Assets.

A View Event may be determined to have occurred, as shown in determining operation 1760. Based on the corresponding View Event in the adget, the View Event may cause one or more things to occur. A View Event may cause a background task (e.g., retrieval of a URL, such as to indicate an ad impression occurred) to occur. A View Event may cause determination of supported Views as shown in determining operation 1730 to occur. A View Event may cause a View to be selected as shown in selecting operation 1740. A View Event may cause a View to be rendered as shown in rendering operation 1750. A View Event may cause a determination of supported Actions as shown in determining operation 1770. A View Event may cause Actions to be rendered as shown in rendering operation 1780. A View Event may cause Actions to be executed as shown in executing operation 1790.

An adget may be parsed to determine what Actions are supported as shown in determining step 1770. A PluginData data may be provided to an adget plugin component (e.g., 162). An entire adget may be provided to the adget plugin component (e.g., 162). An indicium of a predetermined Action may be provided to an adget plugin component (e.g., 162). An indicium of support for an Action may be reported by an adget plugin component (e.g., 162) based on a PluginData data. The indicium of support may be based on a provided indicium of a predetermined Action. The indicium of support may include an indicium of a predetermined Action.

The adget plugin may parse the provided data to determine zero, one, or multiple Actions which the adget plugin supports. In one implementation, the supported Actions which are returned may be of a type unknown to the caller of the adget plugin. A returned Action may have properties common to all Actions (e.g., for use in rendering the Action as shown in Rendering operation 1780), but otherwise be substantially opaque as to what the Action will do when executed (e.g. only the adget plugin and/or related application(s) understand the Action). Examples of common Action properties include a short text description of the Action (e.g., "call", "coupon", "shimmer", etc.), a color scheme for displaying the Action, and a time during which the Action is valid. In one implementation, an app host manager may ignore Action types other than those in a predetermined list of allowed Action types.

An app host manager may keep track of the supported Action(s) reported by each adget plugin. The app host manager may, when the Action should execute, request that the corresponding plugin execute the Action. When the Action should be executed, the app host manager may provide the adget, the Action, and/or an indicium of a requested type of Action to the adget plugin.

In one example implementation, an app host manager 160 supports a plurality of predetermined Actions, each associated with a predetermined indicium (e.g., Call==1, Map==8). In this example, the app host manager 160 queries each registered adget plugin (e.g., 162) in turn until one of the adget plugins indicates support for the Action, or until all registered adget plugins have been queried. In this example, only the PluginData from the Adget is provided to the adget plugin. In this example, if an adget plugin indicated support for the Action, the app host manager tracks which of the adget plugins indicated support for the Action, and indicates that the Action should be rendered as one of the supported Actions. In this example, when the user indicates an intention to execute the action, such as by selecting a visually rendered indicium of the Action, the app host manager may load the adget plugin and request the predetermined Action be executed. In this example, the adget plugin is provided only the PluginData from the adget, and may also be provided an indicium of the predetermined Action to execute using the PluginData.

An app host manager may support none, one, or a limited number of Action types when initially installed (e.g. one Action type of "Call"). A list of registered adget plugins may change over time. For example, a third-party may later register a new adget plugin. A later-registered adget plugin may replace the support for an existing Action (e.g., "Call"). A later-registered adget plugin may provide additional support for an existing Action (e.g., "Call"). A later-registered adget plugin may add support for a new predetermined Action (e.g., "Map"). A later-registered adget plugin may add support for a new opaque Action (e.g., "Shimmer"). Similarly, the support for Actions as reported by a registered adget plugin may change based on other appropriate circumstances, such as changes in device capabilities or other Device Events.

An ad manager may store the adget for later use. In one example, operation 1710 is excluded when the adget is determined to be available (as shown in operation 1720). An ad manager may also synchronize adgets between multiple devices (e.g., all devices it has access to, or devices associated with a user profile). In one implementation, an adget is synchronized between devices only after a user has shown an interest in an adget (e.g., clicked, hovered over, watched multiple times, rewound).

In one implementation, an ad manager supports a non-empty set of predetermined Action types, and supports exactly one adget plugin for each predetermined Action type. For example, an ad manager may query adget plugins for a "Call" or "Directions" predefined Action type, and determine that the Action type is supported when at least one adget plugin indicates supports for this Action type exists.

An Action may be transformed into a rendered form as shown in rendering operation 1780. In one implementation, the Action may be rendered without use of the Action itself. For example, if the Action is of a predetermined Action type, the rendering operation 1780 may render a predetermined icon or text corresponding to the predetermined Action type (e.g., "Call"). In one implementation, an Action may have properties, and the rendering of the Action may be based on the Action properties. For example, the Action may include an icon, text, or other indicium upon which the rendering of the Action should be based.

An Action may be executed as shown in executing operation 1790. An Action may be executed as a result of an Event. In one implementation, an Action is executed when a user interacts with a rendered Action (e.g., clicking on a rendered Action). In one implementation, an Action executes as a result of an Event without user interaction.

For example, when a company is moving locations, an executing Action may be configured to update the contact list information for the company when that date arrives, and indicate the supported Actions should be re-determined (e.g., as in operation 1770). The adget plugin may then indicate a new Coupon action (e.g., moving discount, grand opening celebration discount), and register a future Event for the store closing or new store opening (as appropriate). This future Event may render the Coupon on a device, or may invalidate the coupon.

Figure 18:
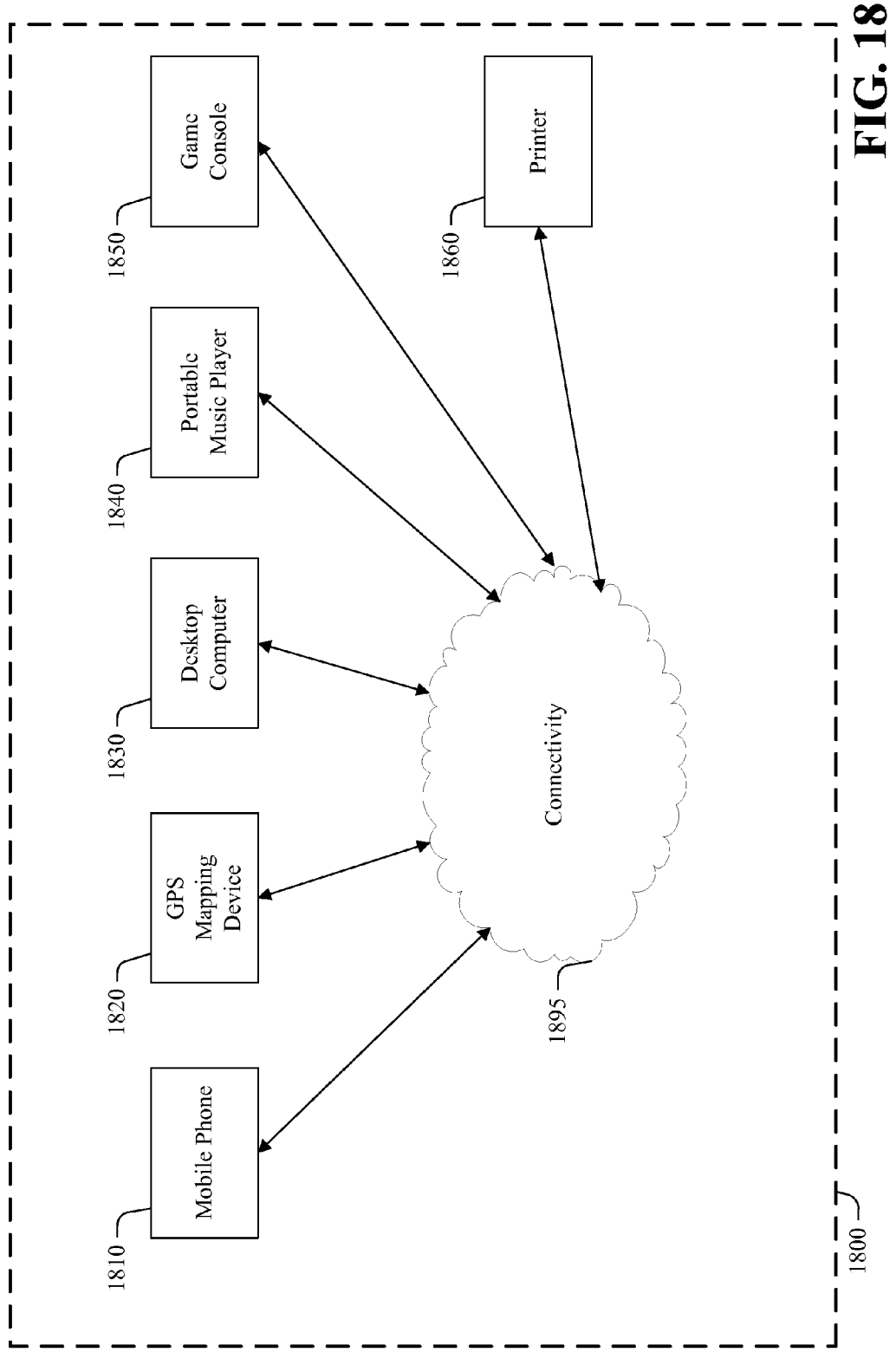
FIG. 18 illustrates an example generalized functional block diagram of a generalized example system for synchronizing an adget and related information across devices.

FIG. 18 illustrates an example generalized functional block diagram of a generalized example system 1800 for synchronizing an adget and related information across devices.

In the example illustrated in FIG. 18, a mobile phone 1810, GPS mapping device 1820, desktop computer 1830, portable music player 1840, and game console 1850 are each connected to each other as illustrated by connectivity 1895. Examples of connectivity 1895 include wired connectivity directly between devices, networking protocols between devices, and connectivity through an intermediate gateway, compression service, or translation layer. Synchronization may occur anytime that one device has connectivity with one or more other devices.

A user may be presented an adget 150 on their mobile phone 1810. For example, if a person uses their phone 1830 to purchase a latte at a coffee shop, the coffee shop may include a coupon adget 150 for a free bagel with the user's next purchase. An ad manager 130 on the mobile phone 1810 may then synchronize the adget with the person's GPS mapping device 1820 when they return to their car (where the GPS unit is installed), and synchronize with the desktop computer 1830 when they phone is set into a charging base at home. The desktop computer may synchronize the adget with a portable music player 1840, game console 1850, and printer 1860.

A single adget may thus be rendered on multiple disparate devices. For example, the printer 1860 may render the adget using a text View (e.g., 1210) on a small uppercase-only LCD screen, and yet support a "Print Coupon" Action resulting in a high-resolution color coupon. The game console 1850 may render the adget using a high-definition promotional video (e.g., 1280×720 landscape, 1920×1080 landscape) commonly used with high-definition televisions, and may support an Action to acquire digital goods (e.g., movie rental downloads, avatars, avatar customizations (e.g., apparel, props, premium items, branded apparel)) related to the ad campaign. The mobile phone 1810 may render the adget using a portrait orientated View, switch to using a landscape oriented View, and provide an Action to place a latte order (and send an SMS when it's ready). The GPS device 1820 may offer an Action to add a dynamic location (based on the current position of the GPS device) of the coffee shop to the user's favorite locations, ensuring they can always find the closest available coffee that they love. The portable music player 1840 may render a View using a promotional music track (e.g., a song the coffee shop plays as background music), with an Action that allows the person to purchase the corresponding album. As can be appreciated, the exposure of the person to the advertisements across devices may enhance an advertising campaign's effect by providing multiple points to generate impressions for the user. This positive effect may be achieved even though only a single adget (and single ad server computation and lookups) was provided.

Figure 19:
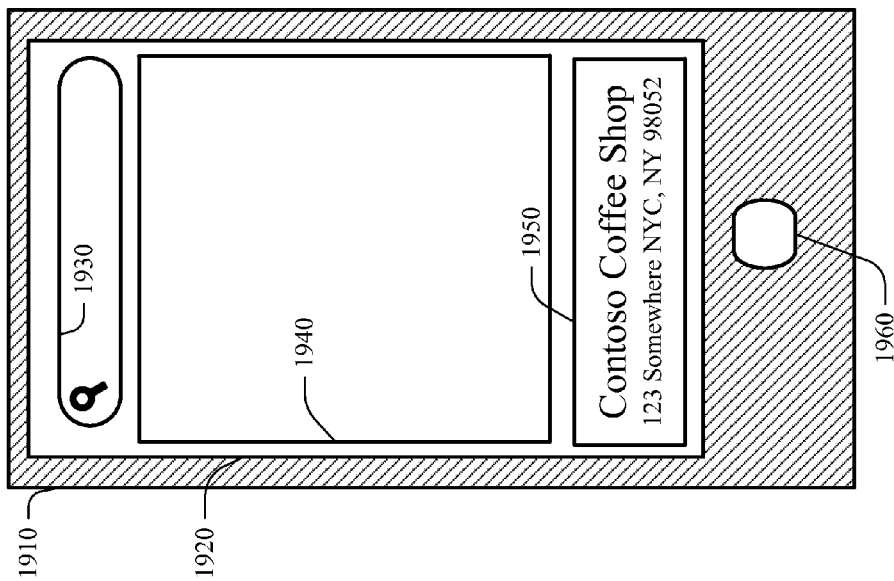
FIG. 19 illustrates an example generalized adget View as may be rendered on an example generalized computing device.

FIG. 19 illustrates an example generalized adget View as may be rendered on an example generalized computing device as an adget View UI element. In the example illustrated, the generalized computing device is an example generalized mobile phone device 1910. Example mobile phone device 1910 has a display 1920 that may accept input (e.g., by touch or by stylus) and a button 1960. For clarity purposes only, the area of the face of the example phone device 1910 which is not included in the display 1920 or button 1960 is filled with diagonal lines in FIG. 19 (but not other figures).

The display 1920 may render a plurality of user interface (UI) elements. A UI element (e.g. 1950) may render a View of an adget. In this example, the display renders a search entry UI element 1930, a search results UI element 1940, and a rendered adget View 1950. A user may indicate interest in the advertisement shown in the rendered adget View 1950. Examples of ways to indicate interest in the advertisement include clicking, touching, zooming, pressing a hardware button (e.g. 1960), and staring at the advertisement for at least a predetermined time (e.g., via eyeball focus tracking technology).

Figure 20:
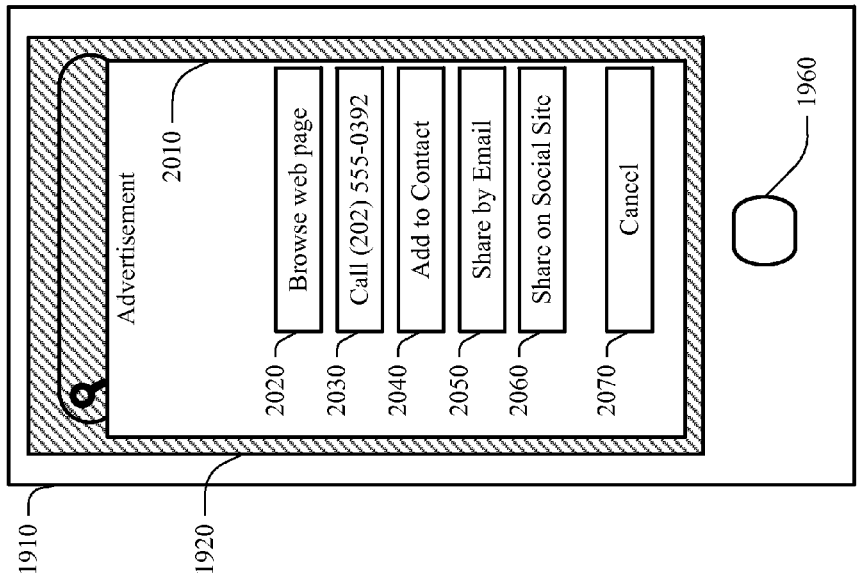
FIG. 20 illustrates an example generalized adget Actions as may be rendered on the example mobile phone device of FIG. 19.

FIG. 20 illustrates an example generalized adget Actions as may be rendered on the example mobile phone device of FIG. 19 as an Actions UI element 2010. The rendered Actions UI element 2010 includes a set of Actions supported on the phone for an adget. The rendering of the Actions may result in a dimming of the remainder of the screen 1920, as shown by a diagonal line fill in FIG. 20. In this example, five rendered Actions (2020, 2030, 2040, 2050, 2060) are shown on the display 1920. The display of five rendered Actions may imply that at least five Actions are supported on the device for the current adget. In this example, a rendered cancel button 2070 is also shown on the display 1920.

Rendered Action 2020 may provide a method of browsing a web page, such as one related to the product or service advertised. Rendered Action 2030 may provide a method of calling a phone number, such as one related to the product or service advertised. Rendered Action 2040 may provide a method of adding a contact, such as a contact for the business related to the product or service advertised. Rendered Action 2050 may provide a method of sharing information corresponding to the advertisement via e-mail. Rendered Action 2060 may provide a method of sharing information corresponding to the advertisement via an online tool.

Figure 21:
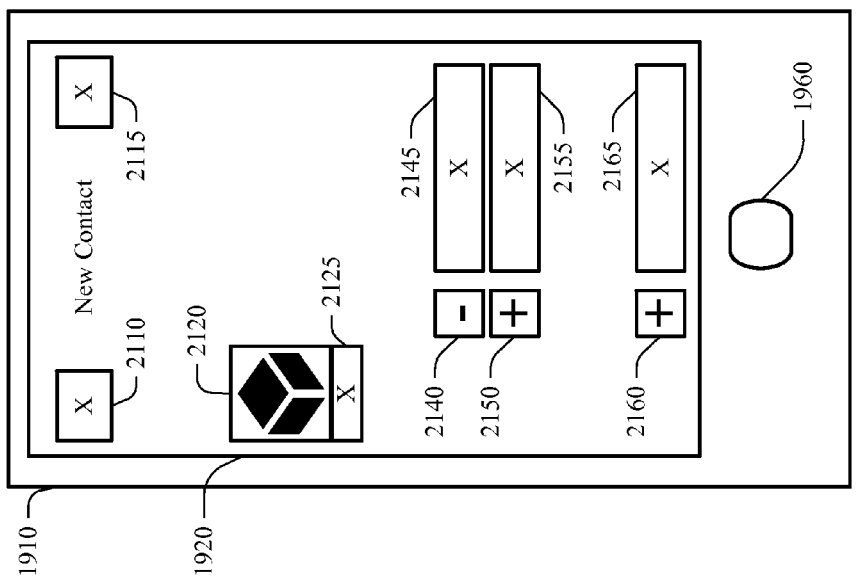
FIG. 21 illustrates an example generalized contact addition UI as may be rendered on the example mobile phone device of FIG. 19.

FIG. 21 illustrates an example generalized contact addition UI as may be rendered on the example mobile phone device of FIG. 19. The contact addition UI may be rendered when an Action to add a contact (e.g., 2040) is executed. A UI element 2110 may provide a method of cancelling the addition of the contact. A UI element 2115 may provide a way to accept the new contact. The contact addition UI may include UI elements that render information about the contact to be added. Rendered UI elements may be grouped, such as by locality when rendered (e.g., 2140, 2150 as one group, 2160 as a second group).

Examples of information about the contact to be added include a graphic 2120 (e.g., photograph, logo), a telephone number (main, secondary, cell, fax, etc.), a ringtone (e.g., a ringtone associated with a specific telephone number, a ringtone for all phone numbers of the contact), an e-mail address, a home page, and an address.

A UI element (e.g., graphic 2120) or group of UI elements may have an associated UI element (e.g. 2125). The associated UI element may provide an indication of actions for the UI element(s) it is associated with. For example, UI element 2125 may provide an indication that graphic 2120 may be modified, may indicate that an alternative graphic may be selected, may indicate that the graphic may not be modified, may indicate that the graphic is dynamic or static data, or may indicate that the graphic may be modified to one of a set of predetermined values.

In the illustrated example, UI element 2140 is associated with UI element 2145, UI element 2150 is associated with UI element 2155, and UI element 2160 is associated with UI element 2165. UI element 2140 indicates that the associated UI element's data may not be modified (i.e., locked), while UI elements 2150 and 2160 indicate that the associated UI element's data may be modified (e.g., changed).

The determination of whether a portion of the contact entry is locked may be based on a locked data factor. Example of locked data factors include advertiser requirements, whether the data is static, whether the data is dynamic, whether the data was provided by the adget, whether the data was generated by the user, a number of allowed data values (e.g., selection allowed if more than one logo in the adget, otherwise locked; selection allowed from multiple addresses in the adget, locked if only one address).

Figure 22:
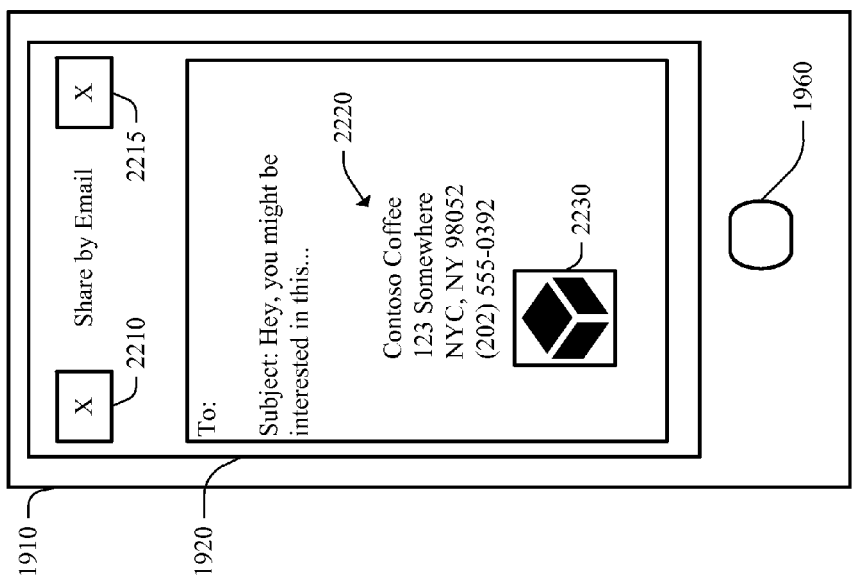
FIG. 22 illustrates an example generalized e-mail sharing UI as may be rendered on the example mobile phone device of FIG. 19.

FIG. 22 illustrates an example generalized e-mail sharing UI as may be rendered on the example mobile phone device of FIG. 19. The e-mail sharing UI may be rendered when an Action to share an advertisement (e.g., 2050) is executed. A UI element 2210 may provide a method of cancelling the sharing by e-mail. A UI element 2215 may provide a way to send the e-mail sharing the advertisement. The shared e-mail may be pre-populated with data based on the adget. Examples of e-mail prepopulated data include text from the adget (e.g., 2220), the adget, and a unique identifier to track the source of the shared adget. In one implementation, the adget may be included in an e-mail (e.g., as shown by rendered graphic 2230) when shared via e-mail.

Figure 23:
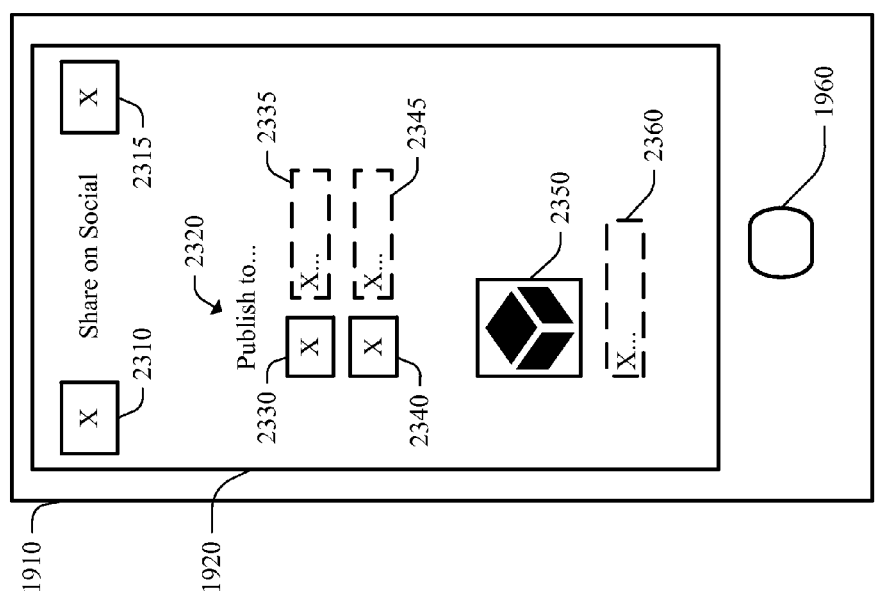
FIG. 23 illustrates an example generalized social sharing UI as may be rendered on the example mobile phone device of FIG. 19.

FIG. 23 illustrates an example generalized social sharing UI as may be rendered on the example mobile phone device of FIG. 19. The social sharing UI may be rendered when an Action to share via a social network (e.g., 2060) is executed. A UI element 2310 may provide a method of cancelling the social sharing. A UI element 2315 may provide a way to accept the social sharing.

In one implementation, the social sharing UI may include a sharing option description 2320 of the Action about to be taken. Example sharing option descriptions include "Publish to your wall and to your friends' home pages?", "Add to your tweets?", and "Add to your favorite links?"

A social sharing UI may include multiple sharing options on a single screen. In the example illustrated, UI element 2330 and 2340 may be selection option UI elements, each associated with UI element 2335 and 2345, respectively. Each of the multiple sharing options may include a sharing option description. For example, UI element 2335 may be "Publish to your wall" and UI element 2345 may be "Share with everyone", and selection option UI elements may both be checkboxes. Example selection options UI elements include checkboxes (e.g., true/false), drop-down lists (e.g., to share with: family, friends, group A may list three items), and spinners. Selection options UI elements may be any conventional selection UI element.

A social sharing UI may include a preview of the shared data as it would be rendered from the social network. For example, the preview may include a preview graphic 2350 and preview text 2360. An example preview text is, "I love this product, and now they are offering free shipping if ordered by February 12th." A preview text may also include hyperlinks, colors, fonts, etc. to emulate the rendering as it would appear once shared.

An ad manager may request credentials for a social network when sharing the adget. In one implementation, an ad manager may cache credentials for a social network to avoid prompting the user in later use of the social network.

Although not required, the system will be described in the general context of computing device executable components, such as executable instructions encoded on a computer-readable storage medium that, when executed by the computing device, cause the computing device to perform acts through a sequence of steps. Unless explicitly indicated as requiring user supervision, each of these acts may occur without user supervision (e.g., an explicitly recited request to perform a task results in a series of autonomous acts by the computing device). The computing device executable instructions can include modules, and be executed by one or more computers or other devices. Generally, modules include routines, programs, objects, components, data structures, etc., that perform particular tasks or implement particular abstract data types. Generally, all or none of the types of modules can be excluded (e.g. "all modules except program modules"). Typically, the functionality of the modules may be combined or distributed as desired in various environments.

Figure 24:
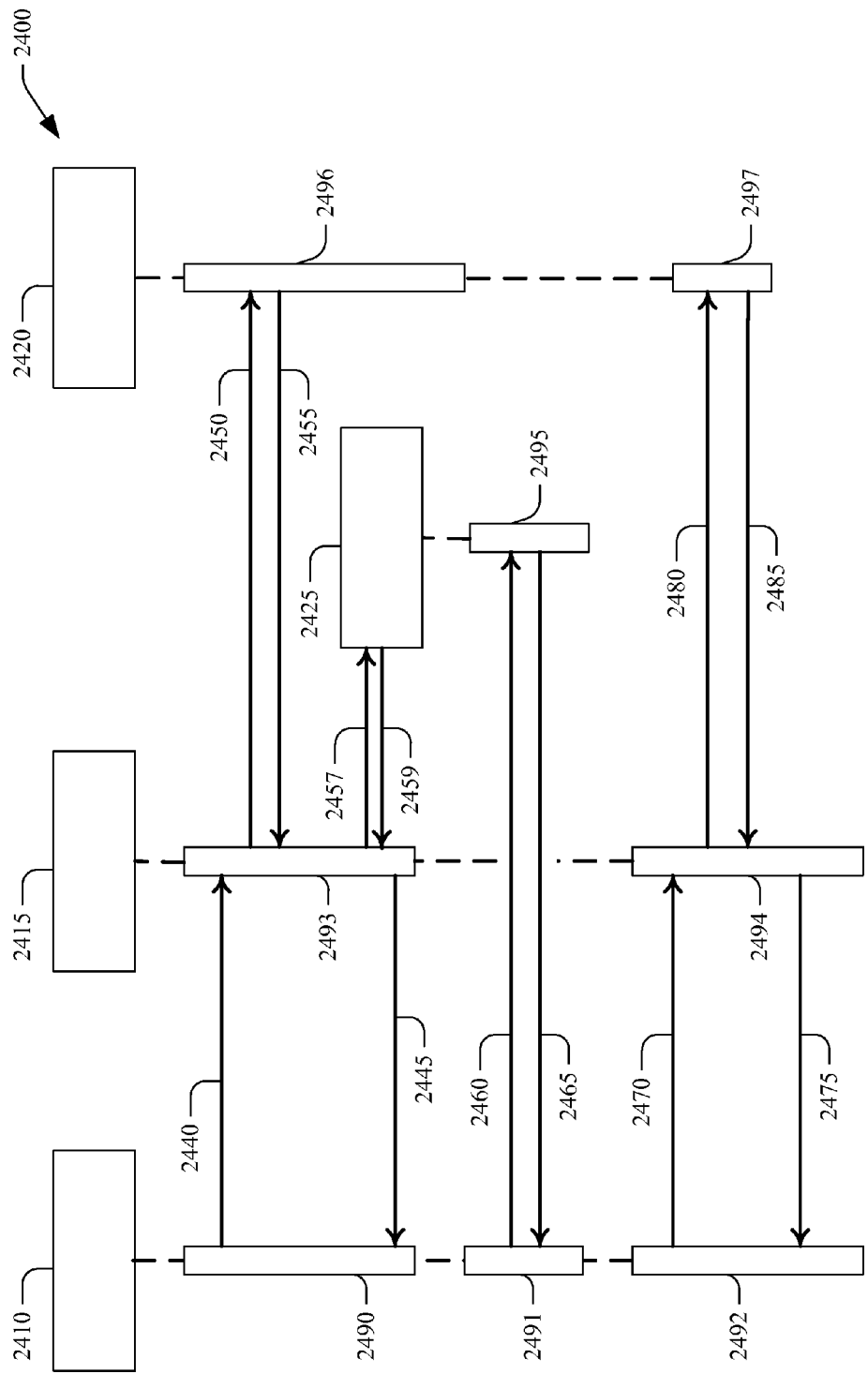
FIG. 24 illustrates illustrate an example generalized interaction between components in one example implementation.

FIG. 24 illustrate an example generalized interaction 2400 between various components in one example implementation. In FIG. 24, time is illustrated as the vertical axis (e.g., 2440 occurs prior to 2450). This example illustrates a first component 2410, instantiated at least as illustrated by boxes 2490, 2491, 2492. This example illustrates a second component 2415, instantiated at least as illustrated by boxes 2493, 2494. This example illustrates a third component 2420, instantiated at least as illustrated by boxes 2496, 2497. This example illustrates a fourth component 2425, instantiated at least as illustrated by box 2495. This example also illustrates various communications between components, as shown by directional arrows 2440, 2445, 2450, 2455, 2457, 2459, 2460, 2465, 2470, 2475, 2480, and 2485. Examples of instantiations of a component include the same component over time, one of a plurality of components of a given type, one of a pre-existing pool of components, and a new component instance. It is understood that these instantiations may be mixed (e.g. 2490 as an existing first component instance, 2491 as a re-use of the same instance as 2490, 2492 as a new instance).

In one example implementation, the first component 2410 is an ad rendering component, the second component 2415 is a mobile ad manager and/or app host manager component, the third component 2420 is an application component (e.g., application services plugin component), and the fourth component 2425 is an Action creating component. The following may be, in one implementation, a chronological order of operations that may occur in the implementation.

A first component instance 2490 may send a GetActions request 2440 to the second component instance 2493. A GetActions request 2440 may include a GetActions request parameter. Examples of GetActions request parameters include an indicium of a specific Action type requested, an adget, and a predetermined portion of an adget (e.g., the PluginData portion).

Second component 2415 may send an IsActionAvailable request 2450 to a third component instance 2496. An IsActionsAvailabe request 2450 may include an IsActionsAvailable request parameter. Examples of IsActionsAvailable request parameters include an indicium of a specific Action type requested, an adget, and a predetermined portion of an adget (e.g., the PluginData portion).

Third component instance 2496 may provide an IsActionAvailable response 2455 to the second component instance 2493. IsActionAvailable response 2455 may include an IsActionAvailable response parameter. Examples of IsAction- Available response parameters include an indicium that an Action is available, an indicium that an Action is not available, an indicium of required capabilities for support (e.g., GPS unit required to support the Action), and an indicium that the required event is never supported by the second component.

Second component instance 2493 may send a CreateAction request 2457 to fourth component 2425. CreateAction request 2457 may include a CreateAction request parameter. Examples of CreateAction request parameters include an indicium of a specific Action type requested, an adget, and a predetermined portion of an adget (e.g., the PluginData portion).

Fourth component 2425 may provide a CreateAction response 2459 to the second component instance 2493. CreateAction response 2459 may include a CreateAction response parameter. Examples of CreateAction response parameters include an indicium of an instance of an Action (e.g., by creating fourth component instance 2495), an indicium that an Action is not available, an indicium of required capabilities for support (e.g., GPS unit required to support the Action), and an indicium that the required event is never supported by the second component.

Second component instance 2493 may provide a GetAction response 2445 to the first component instance 2490. GetAction response 2445 may include a GetAction response parameter. Examples of GetAction response parameters include an indicium of an instance of an Action (e.g., an indicium of a pre-existing fourth component instance 2495), an indicium that an Action is not available, an indicium of required capabilities for support (e.g., GPS unit required to support the Action), an indicium based on a CreateAction response 2459, and an indicium that the required event is never supported by the second component. In one implementation, first component 2410 may then have a list of available Actions.

First component instance 2491 may send a GetRenderingInformation request 2460 to fourth component instance 2495. GetRenderingInformation request 2460 may include a GetRenderingInformation request parameter. Examples of GetRenderingInformation request parameters include an indicium of a specific Action type requested, an adget, a predetermined portion of an adget (e.g., the PluginData portion), a view indicium, and an indicium of an Action (e.g., the indicium of an Action instance from CreateAction response 2459 or indicium from GetAction response 2445).

Fourth component instance 2495 may provide a GetRenderingInformation response 2465 to the first component instance 2491. GetRenderingInformation response 2465 may include a GetRenderingInformation response parameter. Examples of GetRenderingInformation response parameters include information required to render an Action (e.g., image, video, or audio). In one implementation, first component 2410 may then have the information required to render the Action.

First component instance 2492 may send an ExecuteAction request 2470 to second component instance 2494. An ExecuteAction request 2470 may include an ExecuteAction request parameter. Examples of ExecuteAction request parameters include an indicium of a specific Action type requested, an adget, a predetermined portion of an adget (e.g., the PluginData portion), a view indicium, and an indicium of an Action (e.g., the indicium of an Action instance from CreateAction response 2459 or indicium from GetAction response 2445).

Second component instance 2494 may send an Execute request 2480 to third component instance 2497. Execute request 2480 may include an Execute request parameter. Examples of Execute request parameters include an indicium of a specific Action type requested, an adget, a predetermined portion of an adget (e.g., the PluginData portion), a view indicium, and an indicium of an Action (e.g., the indicium of an Action instance from CreateAction response 2459 or indicium from GetAction response 2445). Third component instance 2497 may perform the requested Action based on the Execute request 2480.

Third component instance 2497 may provide an Execute response 2485 to second component instance 2494. An Execute response 2445 may include an Execute response parameter. Examples of Execute response parameters include an indicium of successful start, indicium of successful completion, indicium of asynchronous start, of an indicium of a failure.

The second component instance 2494 may provide an ExecuteAction response 2475 to the first component instance 2492. The ExecuteAction response may include an ExecuteAction response parameter. Examples of ExecuteAction response parameters include an indicium of successful start, indicium of successful completion, indicium of asynchronous start, of an indicium of a failure.

Figure 25:
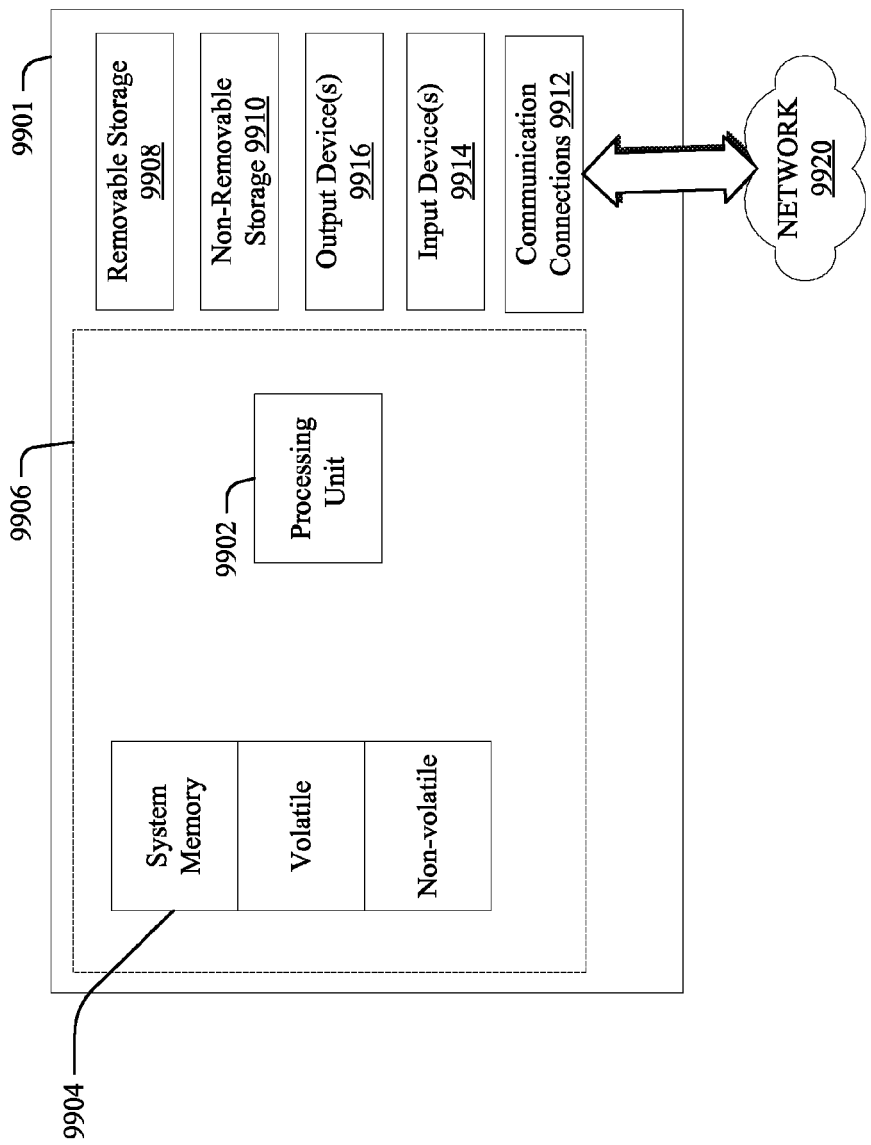
FIG. 25 illustrates an example computing device.

FIG. 25 illustrates an example computing device 9901. The device 9901 may be used to implement a system. In its most basic configuration, device 9901 typically includes at least one processing unit 9902 and at least one device-readable storage medium, such as memory 9904. Depending on the exact configuration and type of device, memory 9904 may be volatile (such as RAM), non-volatile (such as ROM, flash memory, etc.) or some combination of the two.

Additionally, device 9901 may also have additional features and/or functionality. Device 9901 may include additional device-readable storage medium (e.g., removable and/or non-removable), for example magnetic disks, optical discs, or tape. Such additional storage is illustrated in FIG. 1 by removable storage 9908 and non-removable storage 9910. Examples of device-readable storage media include volatile and nonvolatile, removable and non-removable media implemented in any method or technology for storage of information such as device-readable instructions, data structures, program modules, or other data. Memory 9904, removable storage 9908, and non-removable storage 9910 are all examples of device-readable storage media. Additional examples of device-readable storage media are RAM, ROM, EEPROM, flash memory and other memory technology, CD-ROM, digital versatile disks (DVDs) or other optical storage, magnetic cassettes, magnetic tape, magnetic disk storage, magnetic storage devices, and any other medium which can be used to store the desired information and which can be accessed by device 9901. Any such device-readable storage media may be part of the device 9901.

Although the term "file" may be used throughout the application, a person having ordinary skill in the art will recognize that a file is but one of many ways to store a data resource, and that the term file may be replaced with other methods of storage or retrieval of the data resource, regardless of whether it is stored in a structured file system, file, multiple correlated files (e.g., a ZIP file with multiple parts), RAM, or other computing device readable storage medium.

Device 9901 may also contain communication connection(s) 9912 that allow the device 9901 to communicate with other devices, such as with other computing devices through network 9920. Communications connection(s) 9912 is an example of communication media. Communication media typically embodies device-readable instructions, data structures, program modules or other data in a modulated data signal such as a carrier wave or other transport mechanism and includes, without limitation, any information delivery media. The term 'modulated data signal' means a signal that has one or more of its characteristics set or changed in such a manner as to encode information in the signal. Examples of communication media are wired media such as a wired network or direct-wired connection, and wireless media such as acoustic, radio frequency, infrared, and other wireless media.

The term device-readable media is defined as including both storage media and communication media. The term statutory device-readable media is defined as those types of device-readable media which are patentable subject matter under law (e.g., under 35 USC §101).

The term process is defined as including processes, art, and methods. The term statutory process is defined as all methods which are patentable subject matter under law (e.g., under 35 USC §101).

Those skilled in the art will realize that storage devices utilized to store program instructions can be distributed across a network. For example a remote device may store an example of the process described as software. A local or terminal device may access the remote device and download a part or all of the modules to run the program. Alternatively, the local device may download pieces of the modules as needed, or distributively process by executing some operations at the local terminal and some at the remote device (or computer network). Those skilled in the art will also realize that by utilizing conventional techniques known to those skilled in the art that all, or a portion of the operations may be carried out by a dedicated circuit, such as a digital signal processor, programmable logic array, electrically programmable read-only memory (EPROM), TINKERTOY construction sets (see, for example, the computing device called "read head"), erasable EPROM (EEPROM), or the like.

Device 9901 may also have input device(s) 9914 such as keyboard, mouse, pen, voice input device, touch input device, laser range finder, infra-red cameras, video input devices, and/or any other input device. Output device(s) 9916 such as one or more displays, speakers, printers, and/or any other output device may also be included.

What is claimed is:

1. A method executed at a computing device, the method comprising:
   receiving an advertisement from an advertisement server for presentment on a display of the computing device, the advertisement comprising an adget, the adget being an advertisement widget;
   responsive to receiving the adget, parsing the adget to identify actions supported by the adget;
   responsive to parsing the adget, identifying a subset of the actions supported by the adget that are also supported by the computing device, the subset of the actions performed by applications installed on the computing device;
   responsive to identifying the subset of the actions supported by both the adget and the computing device, rendering a view of the adget on the display, wherein the view of the adget comprises an Actions user interface element, the Actions user interface element comprising selectable buttons that are representative of the subset of actions supported by both the adget and the applications installed on the computing device, the selectable buttons rendered based upon the applications installed on the computing device;
   subsequent to rendering the Actions user interface element on the display of the computing device, receiving a selection of a button from the selectable buttons in the Actions user interface element, the button representing an action in the supported actions; and
   responsive to receiving the selection of the button from the selectable buttons in the Actions user interface element:
   instantiating an application from the respective applications, the application capable of performing the action represented by the icon; and
   transmitting data to the application, the data configured to cause the application to perform the action represented by the icon, the application being other than a browser.

2. The method of claim 1,
   wherein the supported actions are a subset of the actions supported by the adget.

3. The method of claim 1, the application being a contacts application that maintains contact information for a user of the computing device, the adget identifies a particular advertiser, the action represented by the button is addition of the advertiser as a contact in the contact information, and the data transmitted to the contacts application comprises a name of the advertiser and a telephone number of the advertiser.

4. The method of claim 1, the application being a calendar application that maintains a calendar, the adget identifies a particular advertiser, the action represented by the button is addition of an event corresponding to the advertiser to the calendar, and the data transmitted to the calendar application comprises a description of the event and a time of the event.

5. The method of claim 1, the application being an email application, the adget identifies a particular advertiser, the action represented by the button is generation of an email corresponding to the advertiser, and the data transmitted to the email application comprises a subject of the email.

6. The method of claim 1, the application being a coupon book application that maintains a coupon book, the adget identifies a particular advertiser, the action represented by the button is addition of a coupon offered by the particular advertiser to the coupon book, and the data transmitted to the coupon book application comprises an electronic coupon to be added to the coupon book.

7. The method of claim 1, wherein rendering the view of the adget comprises
   rendering an advertisement on the display of the computing device, the view of the adget is included in the advertisement.

8. The method of claim 7, the computing device being a mobile computing device, the method further comprising:
   receiving an indication that an orientation of the mobile computing device has changed from a first orientation to a second orientation; and
   re-rendering the advertisement based upon the indication that the orientation of the mobile computing device has changed from the first orientation to the second orientation.

9. The method of claim 1, further comprising:
   responsive to receiving the adget, identifying at least one of an author of the adget, an advertiser that provides the adget, a publisher of the adget, an identity of an advertisement that includes the adget, or a digital signature of the adget;
   assigning a security permission to the adget based upon the identifying of the author of the adget, the advertiser that provides the adget, the publisher of the adget, the identity of the advertisement that includes the adget, or the digital signature of the adget; and
   rendering the view of the adget based upon the assigning of the security permission to the adget.

10. The method of claim 1, the action is supported by multiple applications installed on the computing device, the method further comprising:
- identifying the application in the multiple applications based upon a priority indicium assigned to the application; and
- transmitting the data to the application based upon the identifying of the application in the multiple applications.

11. A method implemented by a processor of a computing device, the method comprising:
- receiving an advertisement from an advertisement server for presentment on a display of the computing device, the advertisement comprising an advertisement widget;
- responsive to receiving the advertisement widget, parsing the advertisement widget to identify actions supported by the advertisement widget;
- responsive to parsing the advertisement widget, identifying a subset of the actions supported by the advertisement widget that are also supported by the computing device, the subset of the actions performed by applications installed on the computing device;
- responsive to identifying the subset of the actions supported by both the advertisement widget and the computing device, rendering the advertisement widget on the display of the computing device, wherein rendering the advertisement widget comprises rendering a plurality of selectable icons that respectively represent the subset of the actions supported by both the advertisement widget and the computing device;
- subsequent to rendering the advertisement widget, receiving a selection of an icon from amongst the plurality of selectable icons; and
- responsive to receiving the selection of the icon:
  - instantiating an application from the respective applications, the application capable of performing the action represented by the icon; and
  - transmitting data to the application, the data configured to cause the application to perform the action represented by the icon, the application being other than a browser.

12. The method of claim 11, the data transmitted to the application is further configured to cause a second computing device to retrieve the advertisement widget when a second instantiation of the application on the second computing device synchronizes with the application on the computing device.

13. The method of claim 11, the parsing of the advertisement widget is undertaken in a security sandbox.

14. The method of claim 11, the action is one of a device action, an instructive action, or a tempting action, the device action causes the computing device to transmit data to another device, the instructive action causes information to be presented on the display, and the tempting action causes advertisement data to be presented on the display.

15. The method of claim 11, further comprising:
- prior to receiving the advertisement, transmitting profile data to an advertisement server that hosts the advertisement, the advertisement widget is selected from amongst a plurality of advertisement widgets based upon the profile data.

16. The method of claim 11, further comprising:
- prior to receiving the advertisement, receiving, from the applications, data that identifies actions supported by the applications, the actions supported by the applications comprise the subset of actions supported by both the advertisement widget and the respective applications.

17. The method of claim 11, further comprising:
- responsive to receiving the selection of the icon, transmitting the advertisement widget to a second computing device.

18. A computing device comprising:
- at least one processor; and
- memory that stores instructions that, when executed by the at least one processor, cause the at least one processor to perform operations, the operations comprising:
  - receiving an advertisement that is to be displayed on a display of a computing device, the advertisement including an adget, the adget being an advertising widget;
  - responsive to receiving the adget, parsing the adget to identify actions supported by the adget;
  - responsive to parsing the adget, identifying a subset of the actions supported by the adget that are also supported by the computing device, the subset of the actions performed by computer-executable applications installed on the computing device;
  - responsive to receiving the advertisement, selecting an adget plugin component that interfaces the adget with a computer-executable application installed on the computing device, the adget plugin component indicates that the computer-executable application to performs an action that is supported by the adget;
  - responsive to selecting the adget plugin component, rendering the advertisement on the display of the computing device, wherein rendering the advertisement on the display of the computing device comprises rendering the adget on the display of the computing device, the adget comprises an icon that is representative of the action;
  - subsequent to rendering the advertisement on the display of the computing device,
  - receiving a selection of the icon; and
  - responsive to receiving the selection of the icon, executing the adget plugin component, wherein the adget plugin component, when executed, causes the computer-executable application to execute the action represented by the icon, the application being other than a browser.

19. The computing device of claim 18, the operations further comprising:
- responsive to receiving the selection of the icon, causing a second computing device to receive the adget.

20. The computing device of claim 18, the computer-executable application is a calendaring application, and the action executed by the calendaring application comprises setting a reminder in the calendar application, the reminder based upon a date or time defined in the advertisement.

* * * * *